United States Patent
Liu et al.

(10) Patent No.: US 8,130,143 B2
(45) Date of Patent: Mar. 6, 2012

(54) FAST DECIMETER-LEVEL GNSS POSITIONING

(75) Inventors: Junjie Liu, Calgary (CA); Ulrich Vollath, Ismaning (DE); Peter Ian West, Christchurch (NZ); Soeren Ulf Klose, Feldkirchen-Westerham (DE)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/321,843

(22) Filed: Jan. 26, 2009

(65) Prior Publication Data
US 2009/0184868 A1    Jul. 23, 2009

Related U.S. Application Data

(63) Continuation of application No. 11/786,017, filed on Apr. 9, 2007, now Pat. No. 7,498,979.

(60) Provisional application No. 60/792,911, filed on Apr. 17, 2006.

(51) Int. Cl.
    *G01S 19/07*    (2010.01)
(52) U.S. Cl. ................................... 342/357.44
(58) Field of Classification Search ............. 342/357.03, 342/357.44
    See application file for complete search history.

(56) References Cited

U.S. PATENT DOCUMENTS

| | | | | |
|---|---|---|---|---|
| 5,323,322 | A * | 6/1994 | Mueller et al. | 342/357.03 |
| 5,899,957 | A * | 5/1999 | Loomis | 342/357.03 |
| 6,531,981 | B1 * | 3/2003 | Fuller et al. | 342/357.03 |
| 6,934,632 | B2 | 8/2005 | Hatch | |
| 2005/0024263 | A1 * | 2/2005 | Sharpe et al. | 342/357.03 |
| 2005/0101248 | A1 | 5/2005 | Vollath | |
| 2005/0231423 | A1 | 10/2005 | Han et al. | |
| 2006/0232467 | A1 | 10/2006 | Small | |
| 2007/0077945 | A1 * | 4/2007 | Sheynblat | 455/456.5 |
| 2007/0120733 | A1 | 5/2007 | Vollath et al. | |
| 2008/0165053 | A1 | 7/2008 | Liu et al. | |

OTHER PUBLICATIONS

White Paper: H-Star Technology Explained, Trimble Navigation Limited, p. 1-9, May 2005.*
L. Mader et al., "*Using Interpolation and Extrapolation Techniques to Yield High Data Rates and Ionosphere Delay Estimates from Continuously Operating GPS Networks*", ION GPS 2002, Sep. 24-27, 2002, Portland, OR, pp. 2342-2347.
L. Sjöberg,*The best linear combinations of L1 and L2 frequency observables in the application of Transit/Doppler and GPS*, Manuscripta Geodetica 15, 1990, pp. 17-22.
A. Gelb, Applied Optimal Estimation, MIT Press, 1974, Chapter 5, *Optimal Linear Smoothing*, pp. 156-179.

(Continued)

*Primary Examiner* — Thomas Tarcza
*Assistant Examiner* — Fred H Mull
(74) *Attorney, Agent, or Firm* — Bruce D. Riter

(57) ABSTRACT

Methods and apparatus are present for determining position of a rover from observations of GNSS signals. Observations of GNSS signals are obtained at a rover location, and observations of the GNSS signals are obtained at a plurality of reference stations, each reference station defining a respective baseline between the rover location and a reference station location. For each reference station, a respective differentially-corrected rover position is determined, wherein at least one of the differentially-corrected rover positions is based on one of (i) a multiple-frequency ionosphere-free observable combination, (ii) a multiple-frequency code-phase observable combination, and (iii) a single-frequency carrier-phase and code-plus-carrier-phase combination. A weighted combination of the differentially-corrected rover positions is prepared.

9 Claims, 25 Drawing Sheets

OTHER PUBLICATIONS

K. Chen et al., *Real-Time Precise Point Positioning Using Single Frequency Data*, ION GNSS 18$^{th}$ International Technical Meeting of the Satellite Division, Sep. 13-16, 2005, Long Beach, CA, pp. 1514-1523.

E. Gill et al., *High-Precision Onboard Orbit Determination for Small Satellites—the GPS-Based XNS on X-SAT*, 6$^{th}$ Symposium on Small Satellites Systems and Services, Sep. 20-24, La Rochelle, France, 2004, pp. 1-6.

S. Leung et al., *High Precision Real-Time Navigation for Spacecraft Formation Flying*, ION GPS/GNSS 2003, Sep. 9-12, 2003, Portland, OR, pp. 2182-2193.

B. Remondi et al., Final Report: Investigation of Global Positioning System Single Frequency Hardware for the U.S. Environmental Protection Agency, EPA Reference DW13936132-01-0, Apr. 1994, ten pages.

T. Yunck, *Single-Frequency Precise Orbit Determination*, Global Positioning System: Theory and Applications vol. II, vol. 164 Progress in Astronautics and Aeronautics, pp. 581-584.

Getting Started Guide: Geoexplorer 2005 Series, Version 1.00, Revision A, Part No. 46506-40-ENG, Oct. 2005, Trimble Navigation Limited, 114 pages.

White Paper: H-Star Technology Explained, Trimble Navigation Limited, 9 pages, Aug. 2005.

Quick Reference Guide: Trimble GPScorrect Extension, Version 1.10, Revision A, Apr. 2005, Trimble Navigation Limited, 114 pages.

Trimble GPScorrect Extension: Release Notes, Version 1.11, Revision A, Oct. 2005, Trimble Navigation Limited, 38 pages.

Getting Started Guide: GPS Pathfinder Office Software, Version 3.10, Revision A, Part No. 34231-31-ENG, Apr. 2005, Trimble Navigation Limited, 158 pages.

GPS Pathfinder Office Release Notes, Version 3.10, Part No. 34195-31-ENG, Revision A, Apr. 2005, Trimble Navigation Limited, 24 pages.

User Guide: GPS Pathfinder Pro Series, Version 1.00, Revision A, May 2005, Trimble Navigation Limited, 46 pages.

GPS Pathfinder Tools SDK: Release Notes, Version 2.00, Part No. 37237-61-ENG, Revision A, Jun. 2005, 44 pages.

Reference Manual: Terrasync Software, Version 2.50, Revision A, Apr. 2005, Trimble Navigation Limited, 352 pages.

Getting Started Guide: Trimble GPS Analyst Extension, Version 1.10, Revision A, Part No. 52652-01, Apr. 2005, 240 pages.

Trimble GPS Analyst Extension: Release Notes, Version 1.10, Part No. 52652-01, Revision A, Apr. 2005, 28 pages.

S. Bisnath et al., *Evaluation of Commercial Carrier Phase-Based WADGPS Services for Marine Applications*, ION GPS/GNSS 2003, Sep. 9-12, 2003, Portland OR, pp. 17-27.

D. Lapucha et al., *Multisite Real-Time DGPS System Using Satellite Data Link: Operational Results*, Navigation: Journal of the Institute of Navigation, vol. 40, No. 3, Fall 1993, pp. 283-296.

D. Lapucha et al., *Decimeter-Level Real-Time Carrier Phase Positioning Using Satellite Link*, ION GPS 2001, Sep. 11-14, 2001, Salt Lake City, UT, pp. 1624-1630.

D. Lapucha et al., *Comparison of the Two Alternate Methods of Wide Area Carrier Phase Positioning, ION GNSS 17$^{th}$* International Technical Meeting of the Satellite Division, Sep. 21-24, 2004, Long Beach, CA, pp. 1864-1871.

A. Simsky, *Standalone Real-time Navigation Algorithm for Single-frequency Ionosphere-free Positioning Based on Dynamic Ambiguities (DARTS-SF)*, ION GNSS 2006, Fort Worth, USA, Sep. 26-29, 2006, ten pages.

P. Teunissen et al., *Ambiguity dilution of precision: Definition, Properties and Application*, Proceedings of the ION GPS-97, pp. 891-899, Sep. 1997.

N. Talbot, "Compact Data Transmission Standard for High-Precision GPS", Proceedings of the 9th International Technical Meeting of the Satellite Division of the Institute of Navigation ION GPS 1996, Sep. 17-20, 1996, Kansas City, MO, pp., p. 861-871.

*RTCM 10402.3 Recommended Standards for Differential GNSS Service, Version 2.3*, Radio Technical Commission for Maritime Services, 2001.

*RTCM 10403.1 Recommended Standards for Differential GNSS Service, Version 3*, Radio Technical Commission for Maritime Services, 2007.

B. Hofmann-Wellenhof, GPS Theory and Practice, 2d. Ed., 1992, Chapter 9, pp. 179-227.

D. Lapucha et al., "*High-Rate Precise Real-Time Positioning Using Differential Carrier Phase*", ION GPS-95, Sep. 12-15, 1995, Palm Springs, CA, pp. 1443-1449.

Y. Gao et al., *High Precision Kinematic Positioning Using Single Dual-Frequency Receiver*, The International Archives of the Photogrammetry, Remote Sensing and Spatial Information Sciences, Proc. of the XX$^{th}$ ISPRS Congress, Istanbul, Turkey, 2004, vol. 34, Part B3, pp. 845-849.

G. Welch et al., *An Introduction to the Kalman Filter*, UNC-Chapel Hill, TR 95-041, Jul. 24, 2006 (sixteen pages).

R. Brown et al., Introduction to Random Signals and Applied Kalman Filtering, Second Edition, John Wiley & Sons, 1992, Chapter 10, pages, p. 409-455.

U. Vollath et al., *Network RTK Versus Single Base RTK—Understanding the Error Characteristics*, Proceedings of the GNSS-2002 Conference, May 2002, pp. 2774-2780.

F. Brunner et al., *GPS Signal Diffraction Modelling: The Stochastic SIGMA-D Model*, J. Geod., 73, 259-267, 1999.

H. Hartinger et al., *Variances of GPS Phase Observations: The SIGMA-E Model*, GPS Solutions, 2/4,35-43,1999.

G. Bierman, *Factorization Methods for Discrete Sequential Estimation*, Academic Press, 1977.

A. Gelb, (Ed.), *Applied Optimal Estimation*, The M.I.T. Press, 1977, pp. 133-136.

F. Van Diggelen, *GPS Accuracy: Lies, Damn Lies, and Statistics*, GPS World, Nov. 29, 1998 (five pages).

A. Wiesner et al., *An extended weight model for GPS phase observations*, Earth Plants Space, 52, pp. 777-782, 2000.

\* cited by examiner

Interpolate Measurement at Epoch $t_1$ from Epochs $t_0$ and $t_2$

FAST DECIMETER-LEVEL GNSS POSITIONING

CROSS REFERENCE TO RELATED APPLICATIONS

This application is a continuation of U.S. patent application Ser. No. 11/786,017, filed 9 Apr. 2007, now U.S. Pat. No. 7,498,979, the content of which is incorporated herein by this reference. The content of U.S. patent application Ser. No. 10/696,528 filed Oct. 28, 2003 is incorporated herein by this reference, and the content of Provisional U.S. Patent Application No. 60/792,911 filed 17 Apr. 2006 is incorporated herein by this reference.

FIELD OF THE INVENTION

The present invention relates to the field of Global Navigation Satellite Systems. More particularly, the present invention relates to processing of signals received from multiple satellites of such systems.

BACKGROUND OF THE INVENTION

Global Navigation Satellite Systems (GNSS) include the Global Positioning System (GPS), the Glonass system, and the proposed Galileo system. Each GPS satellite transmits continuously using two radio frequencies in the L-band, referred to as L1 and L2, at respective frequencies of 1575.41 MHz and MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequency, a pseudo-random number (PRN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond.

SUMMARY OF THE INVENTION

Improved methods and apparatus for processing GNSS signals are provided by embodiments in accordance with the present invention.

PART 1: GNSS Post-processing engine. In accordance with some embodiments of the invention, a post-processing engine is provided which enables a two decimeter (1-sigma) horizontal positioning accuracy after an occupation time of two minutes with dual-frequency differential carrier phase positioning for baselines up to several hundred kilometers. This is a great performance leap compared to the previous processing engines, where occupation time was usually several times as long for the same accuracy. To achieve high accuracy with low occupation time, a number of innovative techniques have been developed and employed, such as the super-smoothing of the reference station data using data from several hours before and after the matched rover occupation time, densifying the reference observation to any interval through filtered interpolation, forward and backward filtering and final smoothing, application of whitening of noise technique to remove redundant multipath states to improve observability in short time span, using the L1 carrier phase and the L1 carrier phase plus L1 code observable combination to efficiently filter the single-frequency case, and detection of movement of the rover during static periods. Accuracy can be further enhanced in accordance with some embodiments of the invention with multi-baseline adjustment.

PART 2: Post-processing Accuracy (PPA) Predictor. In accordance with some embodiments of the invention, post-processing accuracy is predicted during data collection using a look-up table in which the input variables include one or more of: duration since carrier lock was acquired; HDOP (horizontal dilution of precision), number of GNSS satellites being continuously tracked; and whether single or dual frequency carrier data is being logged. These parameters are fed into a function that looks up a PPA value from a pre-defined table. The values in the table have been assigned as a result of prior processing of sample data with said parameters. Other input variables can also be used, such as PDOP instead of HDOP, and the knowledge of whether the antenna is static or moving. Predicted accuracy in accordance with some embodiments is horizontal RMS (root mean square). The same techniques can be used to predict vertical accuracy, for example with different input variables such as VDOP (vertical dilution of precision).

These and other aspects and features of the present invention will be more readily understood from the embodiments described below with reference to the drawings, in which.

DETAILED DESCRIPTION

Part 1: GNSS Post Processing Engine

Some embodiments in accordance with the invention provide a GNSS post-processing engine which enables a user to achieve two decimeter (1-sigma) horizontal accuracy over a short occupation time of two minutes with dual-frequency differential carrier phase positioning for baselines up to several hundred kilometers. This is a great performance leap compared to the previous processing engines, where occupation time was usually several times as long for the same accuracy. To achieve the high accuracy, low occupation time goal, a number of innovative techniques have been developed and employed, such as the super-smoothing of the reference station data using data from several hours before and after the matched rover occupation time, densifying the reference observation to any interval through filtered interpolation, forward and backward filtering and final smoothing, application of whitening of noise technique to remove redundant multipath states to improve observability in short time span, using the L1 carrier phase and the L1 carrier phase plus L1 code observable combination with single-differencing to efficiently filter the single-frequency case, and detection of movement of the rover during static periods. All these techniques will be discussed in detail below.

Figure 1:
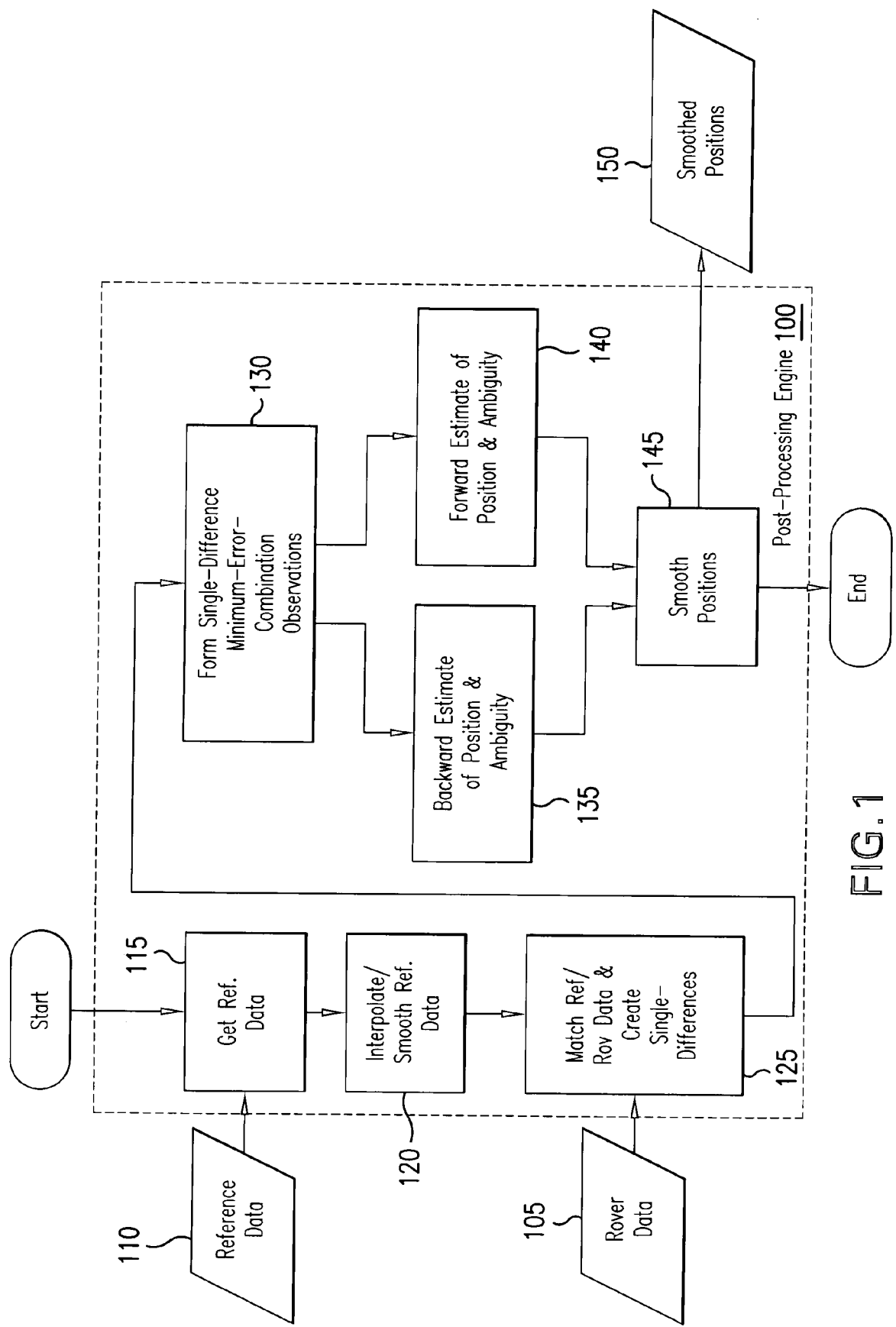
FIG. 1 is a flowchart of a post-processing engine in accordance with an embodiment of the invention.

Post Processing Engine Flowchart. FIG. 1 is a flowchart of a post-processing engine 100 in accordance with an embodiment of the invention. It contains seven basic modules for post-processing a set or rover data 105 with reference data 110: (1) module 115 gets the reference data, (2) module 120 interpolates and smooths the reference data from 30-second intervals to 1-second intervals, (3) module 125 matches the reference and rover data, (4) module 130 forms the single-difference minimum-error-combination observations, (5) module 135 prepares a backward estimate of the position and ambiguity, (6) module 140 prepares a forward estimate of the position and ambiguity, and (7) module 145 smooths the positions by combining the backward and forward estimate results. Each module is explained below.

Module 1: Get Reference Data from a Reference Station.

Figure 2:
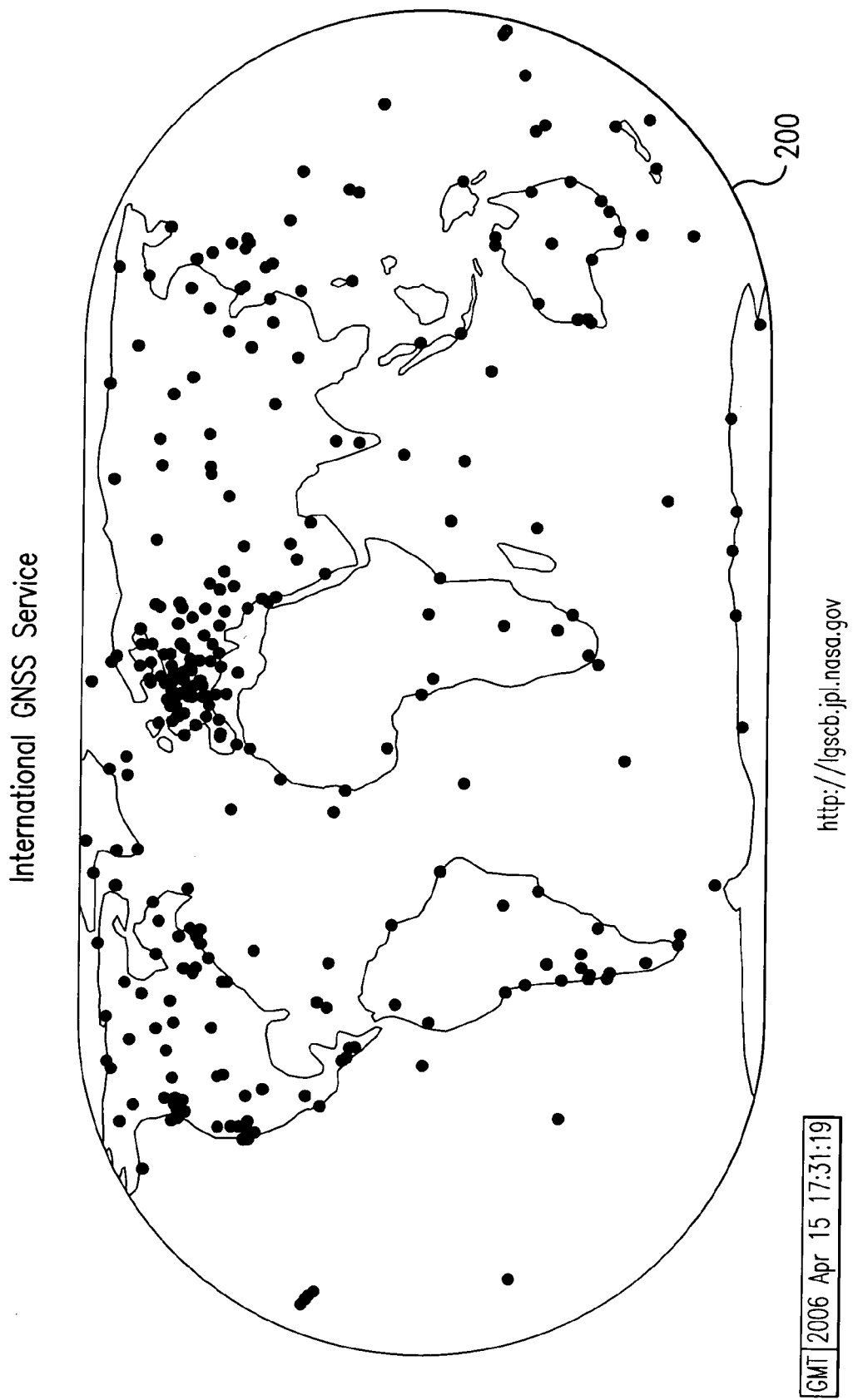
FIG. 2 shows reference-station locations of the International GNSS Service.

The field hardware is a single GPS rover, such as a Trimble GeoExplorer 2005 series or Trimble GPS Pathfinder ProXH or Trimble GeoXH handheld GPS receiver, with or without optional external Zephyr antenna. The user does not need a reference receiver. Raw GPS measurement and navigation data can be downloaded free of charge from many sources, such as the International GNSS Service (IGS) website www.igscb.jpl.nasa.gov, which includes more than 300 stations worldwide as shown in map 200 of FIG. 2.

Module 2: Interpolate and Smooth the Reference Data.

Figure 3:
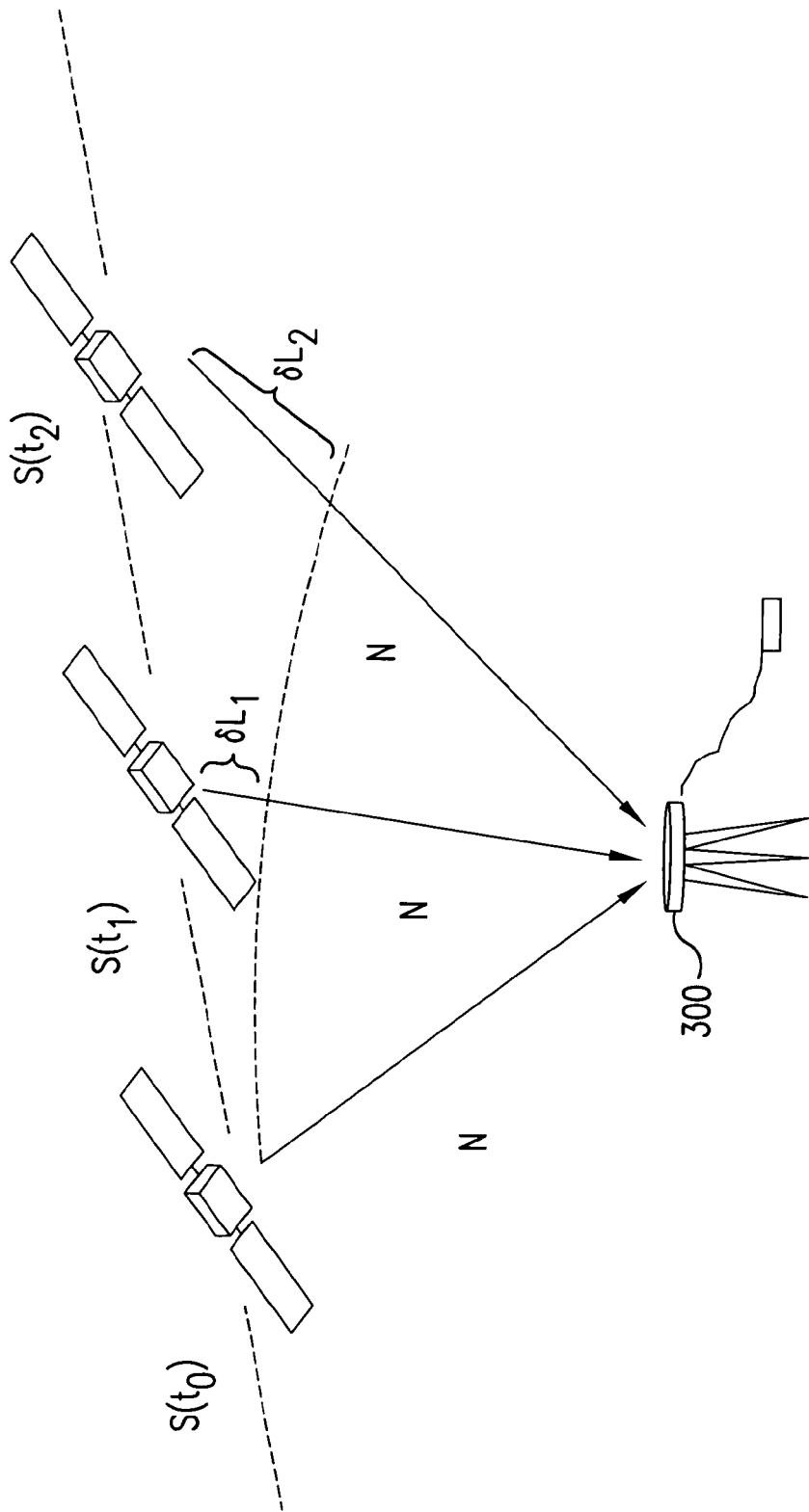
FIG. 3 illustrates a situation where reference data is available at epochs $t_0$ and $t_2$, and reference data at an intervening epoch $t_1$ is generated using interpolation in accordance with an embodiment of the invention.

The raw reference-station data can be used in post-processing in combination with the rover data. However, there is a drawback of these free data. They are generally decimated at 30-second intervals for data-storage purposes. Many rover receivers operate at 1-second intervals and there is thus a data synchronization issue between the reference data and the rover data (if only matching epochs are used, much of the rover data information is discarded). To overcome this problem, the reference data is interpolated from 30-second intervals to one-second intervals. FIG. 3 illustrates a situation where reference data from a reference station 300 is only available at epochs $t_0$ and $t_2$ (30 seconds apart), and reference data at epoch $t_1$ is generated using interpolation in accordance with an embodiment of the invention.

A known technique for interpolating GPS data is described in L. MADER et al., "*Using Interpolation and Extrapolation Techniques to Yield High Data Rates and Ionosphere Delay Estimates from Continuously Operating GPS Networks*", ION GPS 2002, 24-27 Sep. 2002, Portland, Oreg., National Geodetic Survey, NOS/NOAA, Silver Spring, Md. This technique uses a high-order polynomial (typically $8^{th}$ order). This approach suffers from the fact that a missing reference epoch or a cycle slip would prevent interpolation being done for up to the number of polynomial order epochs (if an $8^{th}$ order polynomial is used, then interpolation will not be possible for up to 8 epochs of reference epochs).

In contrast, embodiments in accordance with some embodiments of the present invention employ an interpolation method in which the geometry is subtracted from the carrier phase and code measurement using the ephemeris, the remaining geometry-free errors are interpolated (or modeled with a Kalman filter), and the geometry is added back to the interpolated geometry-free errors. This is possible because the remaining errors are fairly low frequency.

Equation (1) lists the observation equations for GNSS code and carrier-phase observations for the $i^{th}$ carrier frequency (for GPS i=1, 2 currently).

$$\rho_i = R + \delta R + c(\delta t_r - \delta t_s) + T + \frac{\lambda_i^2}{\lambda_1^2}I + \varepsilon_{\rho_i} \qquad (1)$$

$$\lambda_i(\phi_i + N_i) = R + \delta R + c(\delta t_r - \delta t_s) + T - \frac{\lambda_i^2}{\lambda_1^2}I + \varepsilon_{\phi_i}$$

Where:

$\rho_i$: Code/pseudorange measurement $\phi_i$: Carrier phase measurement

R: Geometric range between the receiver and the satellite

δR: Satellite orbit error c: Vacuum speed of light $\delta t_s$: Satellite clock error (including the relativistic correction)

Figure 4A:
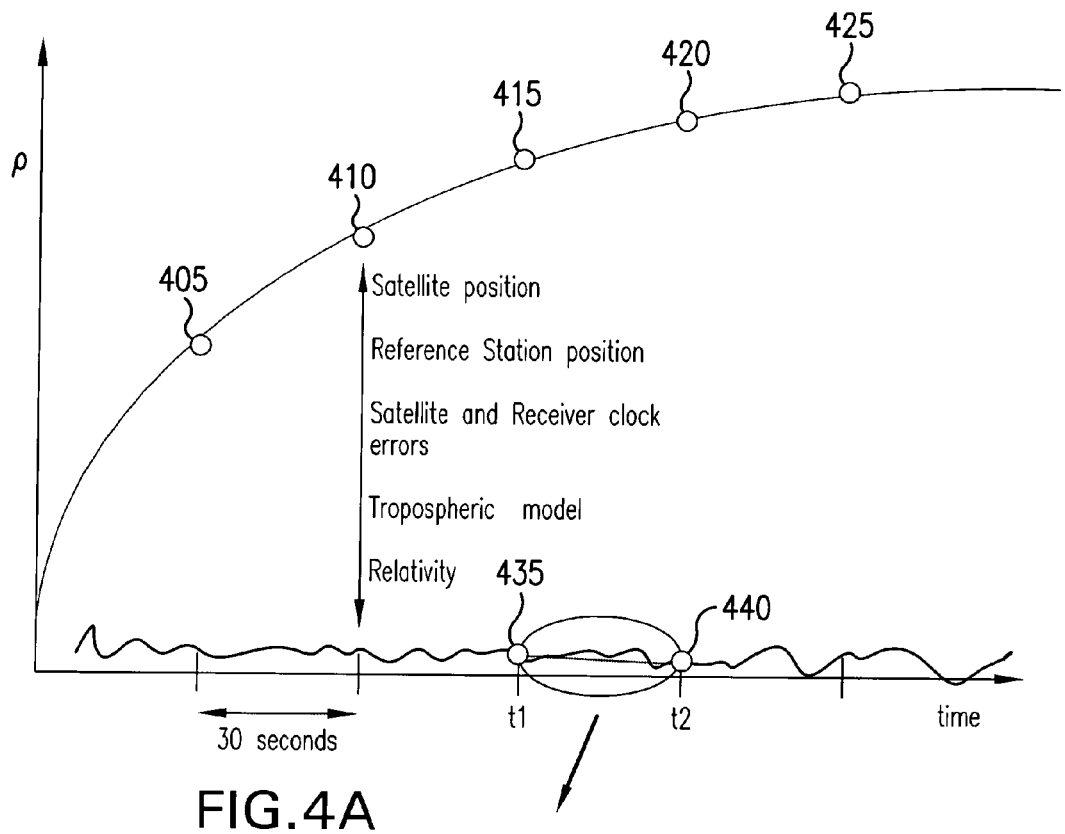
FIG. 4A and FIG. 4B illustrate a principle of interpolation in accordance with some embodiments of the invention.
Figure 4B:
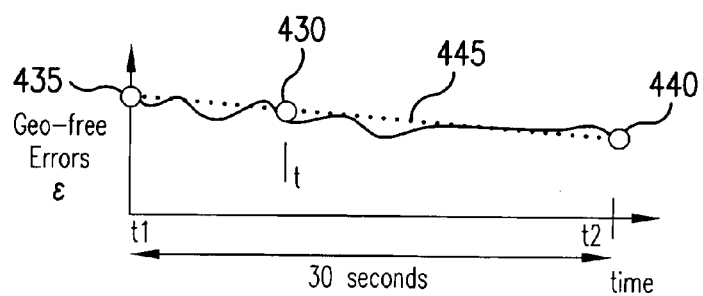

$\delta t_r$: Receiver clock error $N_i$: Carrier phase initial ambiguity $\lambda_i$: Wavelength I: Ionospheric error T: Tropospheric error $\epsilon_{\rho_i}, \epsilon_{\phi_i}$: Code and carrier multipath and measurement noise FIGS. 4A and 4B illustrate a principle of interpolation in accordance with some embodiments of the invention. As shown in FIG. 4A, the code/pseudorange measurements 405, 410, 415 of the reference station, e.g., at discrete 30-second intervals, are a composite of known, mainly geometry-related elements (e.g., satellite position, reference station position, satellite and receiver clock error, modelled tropospheric effect, relativity) and unknown elements (e.g., satellite orbit/clock error, residual tropospheric error, ionospheric error, multipath, noise). The known/geometry-related elements are subtracted, leaving a residual error at each discrete time-point $t_j$ $$\varepsilon_{\rho_i}(t_j) = \rho_i(t_j) - R(t_j) - c[\delta t_r(t_j) - \delta t_s(t_j)] - T(t_j) - \frac{\lambda_i^2}{\lambda_1^2} I(t_j) \quad (2)$$

$$\varepsilon_{\phi_i}(t_j) = \lambda_i[\phi_i(t_j) + N_i] - R(t_j) - c[\delta t_r(t_j) - \delta t_s(t_j)] - T(t_j) - \frac{\lambda_i^2}{\lambda_1^2} I(t_j)$$

A simple interpolation approach in accordance with an embodiment of the invention is to determine a linear interpolation for example at 1-second intervals between the discrete samples at 30-second intervals, e.g., interpolate a residual 430 at time t between residual 435 at $t_1$ and residual 440 at $t_2$ as illustrated at 440 in FIG. 4B.

With the phase change rate between two time points $t_1$ and $t_2$ $$\delta\varphi_i = \lambda_i \delta\phi_i = \frac{\varepsilon_{\phi_i}(t_2) - \varepsilon_{\phi_i}(t_1)}{t_2 - t_1} \quad (3)$$

the interpolated phase residual at an intermediate time point t is $$\epsilon_{\phi_i}(t) = \epsilon_{\phi_i}(t_1) + (t - t_1)\delta\phi_i. \quad (4)$$

For the dual frequency case i=1, 2 the phase change rate can be split into two parts. A frequency independent (geometric) part $$\delta\varphi_G = -\frac{\lambda_2^2}{\lambda_1^2 - \lambda_2^2} \delta\varphi_1 + \frac{\lambda_1^2}{\lambda_1^2 - \lambda_2^2} \delta\varphi_2 \quad (5)$$

and a frequency dependent (ionospheric) part $$\delta\varphi_I = -\frac{\lambda_1^2}{\lambda_2^2 - \lambda_1^2} (\delta\varphi_1 - \delta\varphi_2). \quad (6)$$

With that the code change rate can be expressed as $$\delta\rho_i = \delta\varphi_G + \frac{\lambda_i^2}{\lambda_1^2} \delta\varphi_I \quad (7)$$

and the interpolated code residual at an intermediate time point t is $$\epsilon_{\rho_i}(t) = \epsilon_{\rho_i}(t_1) + (t - t_1)\delta\rho_i. \quad (8)$$

Now, with the interpolated code- and phase residual, the code and the phase at the intermediate time point t is computed as $$\rho_i(t) = R(t) + c[\delta t_r(t) - \delta t_s(t)] + T(t) + \frac{\lambda_i^2}{\lambda_1^2} I(t) + \varepsilon_{\rho_i}(t) \quad (9)$$

$$\lambda_i[\phi_i(t) + N_i] = R(t) + c[\delta t_r(t) - \delta t_s(t)] + T(t) - \frac{\lambda_i^2}{\lambda_1^2} I(t) + \varepsilon_{\phi_i}(t)$$

The advantage of this interpolation scheme is, that the code is interpolated using the phase change rate. This is more precise than a code-only based interpolation of the code measurements.

Another approach in accordance with an embodiment of the invention is to interpolate for example at 1-second intervals between the discrete samples at 30-second intervals using a linear Kalman filter. The linear function of the Kalman filter is modelled by its bias (offset and change rate). The Kalman filter filters out noise, possibly more effectively than a linear interpolation, as it is a weighted interpolation (adjustment). A minimum of two samples allows a linear interpolation, while more samples allows reduction of errors. The Kalman filter is run on the small residual to a time point of interest (e.g., a desired 1-second interval point t) and the change rate is obtained from the Kalman filter for use as a linear interpolation factor from a reference-sample time to that point.

Figure 5:
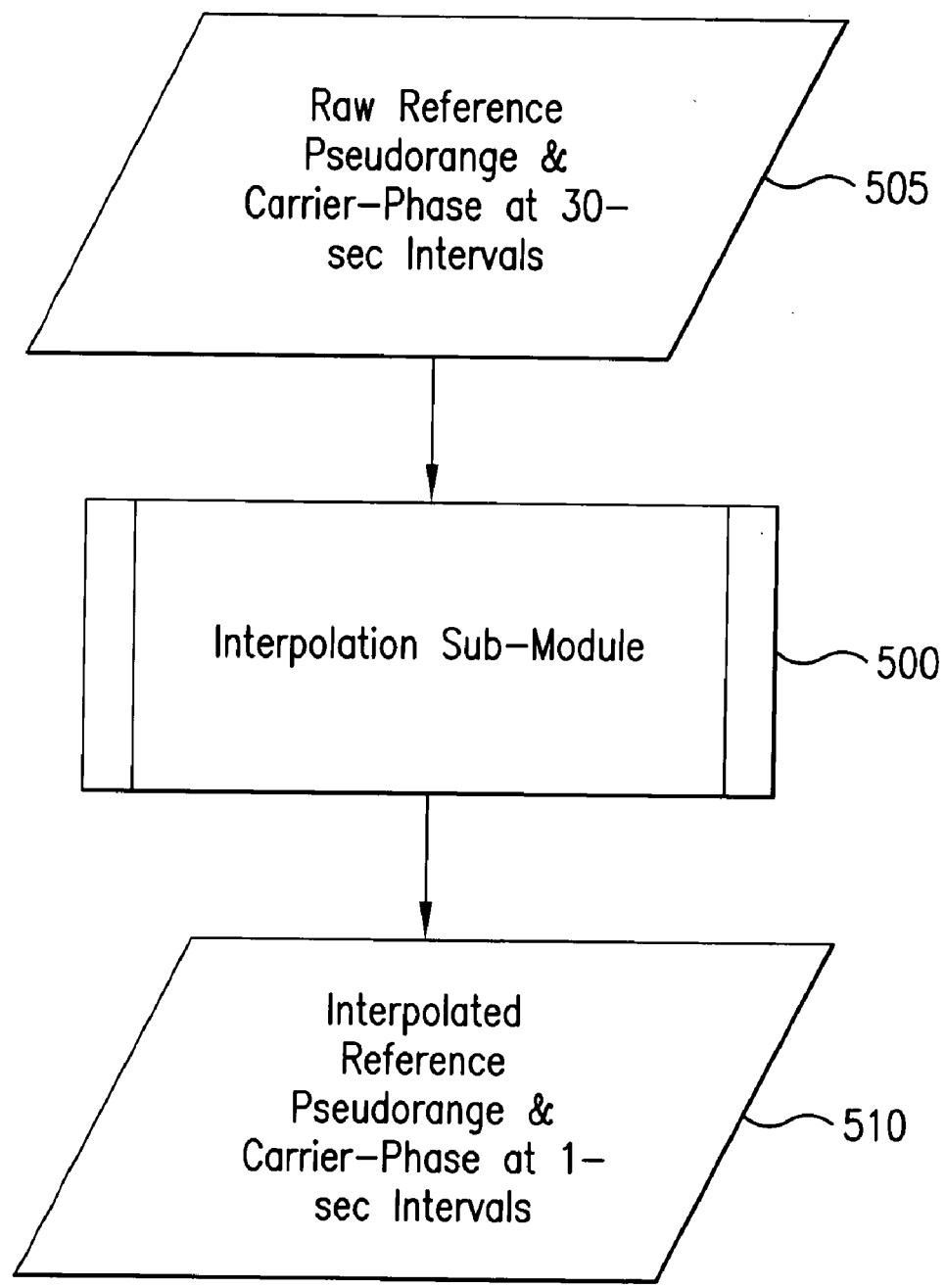
FIG. 5 illustrates the input and output data of an interpolation sub-module in accordance with some embodiments of the invention.

FIG. 5 shows the input and output data of the interpolation sub-module 500 of interpolation and smoothing module 120. The input data 505 are dual-frequency pseudorange and carrier-phase measurements from the reference stations, typically at 30-second intervals. The output data from interpolation sub-module 510 are pseudorange and carrier-phase measurements at, for example, one-second intervals.

Figure 6:
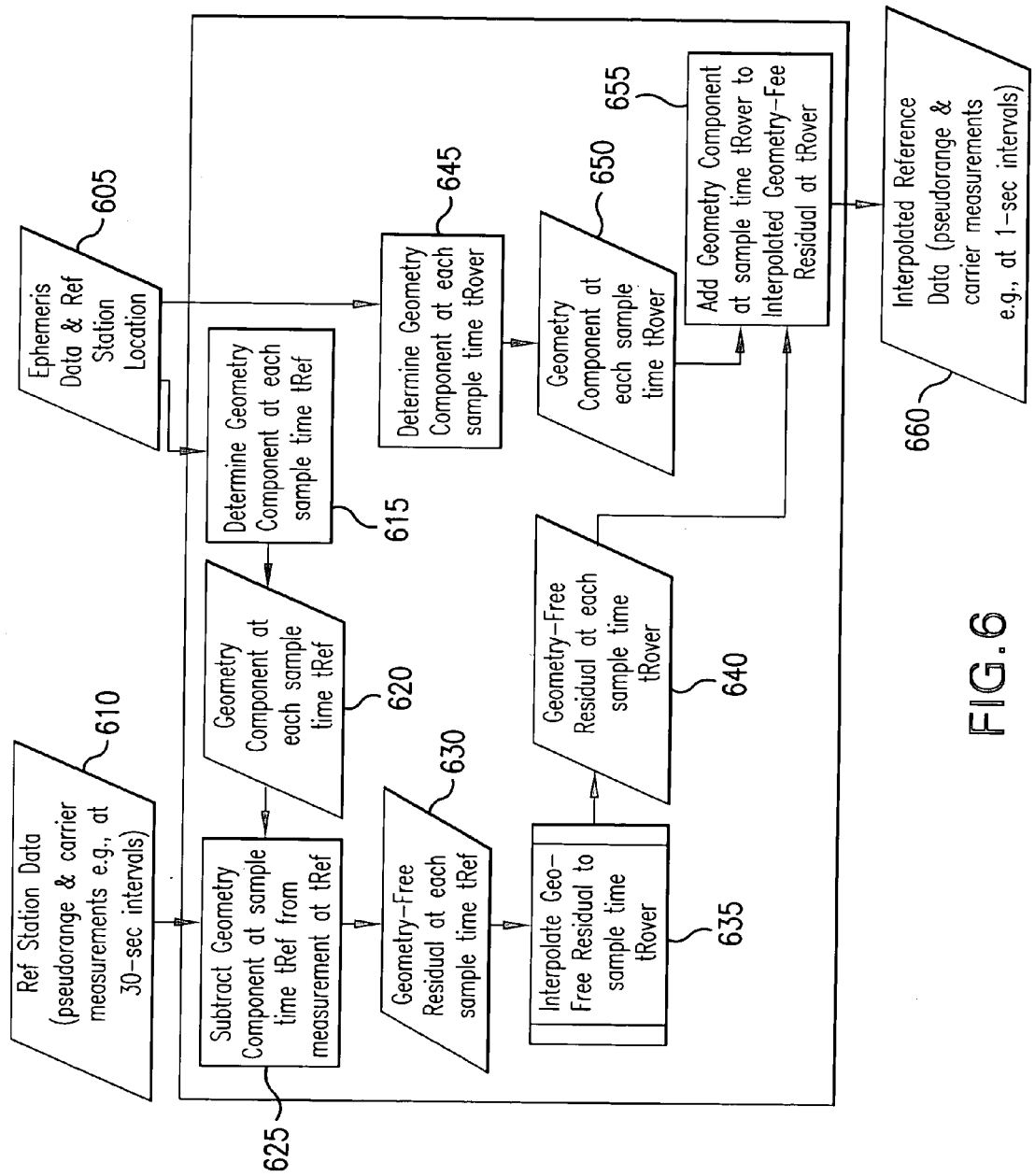
FIG. 6 is a flow chart showing a process for interpolation of reference station data in accordance with some embodiments of the invention.

FIG. 6 is a flow chart showing a process 600 for interpolation of reference station data in accordance with some embodiments of the invention. Ephemeris data and reference-station location data 605 are known. Reference-station data 610, e.g., pseudorange and dual-frequency carrier measurements at 30-second intervals from IGS sources, is accessed. The ephemeris data and reference station location are used at 615 to determine a geometry component 620 of the reference-station measurement at each reference-station-measurement time tRef. For each reference-station-measurement time tRef of interest, the geometry component is subtracted from the reference-station measurement at 625 to produce a geometry-free residual 630. These residuals are supplied to an interpolation process 635 (e.g., a linear interpolator, or a linear Kalman-filter which produces a weighted interpolation) to prepare geometry-free residuals 640 at times tRover corresponding to the sample times of the rover measurements to be post-processed (e.g., at 1-second intervals). The ephemeris data and reference station location are used at 645 to determine a geometry component 650 of the reference-station measurement at each rover-data-sample time tRover (e.g., at 1-second intervals). For each rover-data-sample time tRover, the interpolated geometry-free residual and the determined geometry component are added at 655 to produce an interpolated reference measurement 660.

Another problem of using public reference data is that the quality of the reference receiver varies significantly. Although it is assumed that most IGS/CORS reference stations use geodetic quality receivers, it is still highly probable that the user will encounter suboptimal reference data, for example, data having strong multipath due to bad antenna location. To overcome this problem, a super-smoothing algorithm is employed on the reference code measurements to reduce its multipath substantially. This smoothing can be performed using all the reference data available, independent of the rover data. The rover may only have an occupation of two minutes for a specific point of interest; however the reference-station data can be smoothed by using all the reference-station data for a period from several hours before until several hours after the rover's occupation time since the smoothing has nothing to do with the rover data itself, only the time matters.

Smoothing merges 'absolute' pseudorange capability and 'relative' carrier phase capability. The GPS pseudorange measurement is noisy but not ambiguous; the GPS carrier-phase measurement is precise but ambiguous. Precise and unambiguous pseudorange measurement can be produced by combining these properties. The method is to average the geometry-free, ionosphere-free code-minus-carrier observable, which essentially contains only multipath, noise, and ambiguity. If the tracking is continuous for a satellite for several hours, the noise and multipath can be effectively removed, giving an accurate ambiguity. The smoothed pseudorange at any epoch is recovered by adding the averaged ambiguity to the epoch value of the carrier phase combination used to compute the ambiguity. Thus the precision of the smoothed reference code will approach that of the carrier phase.

In the dual frequency case i=1, 2, using the observation equations (1), a divergence-free smoothing formula can be constructed as follows:

$$\rho_1 - \lambda_1\phi_1 - 2\frac{\lambda_1^2}{\lambda_2^2 - \lambda_1^2}(\lambda_1\phi_1 - \lambda_2\phi_2) = \tag{10}$$

$$-\lambda_1 N_1 - 2\frac{\lambda_1^2}{\lambda_2^2 - \lambda_1^2}(\lambda_1 N_1 - \lambda_2 N_2) = N_{s1}$$

$$\rho_2 - \lambda_2\phi_2 - 2\frac{\lambda_2^2}{\lambda_2^2 - \lambda_1^2}(\lambda_1\phi_1 - \lambda_2\phi_2) =$$

$$-\lambda_2 N_2 - 2\frac{\lambda_2^2}{\lambda_2^2 - \lambda_1^2}(\lambda_1 N_1 - \lambda_2 N_2) = N_{s2}$$

Where $$\frac{\lambda_1^2}{\lambda_2^2 - \lambda_1^2}[\lambda_1(\phi_1 + N_1) - \lambda_2(\phi_2 + N_2)] \tag{11}$$

is the ionospheric error on L1.

As long as there is no cycle slip, then the right side of Equation (10) is a constant. Code super-smoothing is based on this property; it accumulates the left side of Equation (10), and calculates the mean values $\tilde{N}_{s1}$ and $\tilde{N}_{s2}$ over multiple epochs. The smoothed pseudo-range at epoch ($t_k$) can be calculated as $$\rho_{s1}(t_k) = \lambda_1\phi_1(t_k) + 2\frac{\lambda_1^2}{\lambda_2^2 - \lambda_1^2}(\lambda_1\phi_1(t_k) - \lambda_2\phi_2(t_k)) + \tilde{N}_{s1} \tag{12}$$

$$\rho_{s2}(t_k) = \lambda_2\phi_2(t_k) + 2\frac{\lambda_2^2}{\lambda_2^2 - \lambda_1^2}(\lambda_1\phi_1(t_k) - \lambda_2\phi_2(t_k)) + \tilde{N}_{s2}$$

If the satellite is tracked continuously for an extended period of time without any cycle slip, then the smoothed pseudo-range will be as precise as the carrier phase observation. A huge reduction of noise level is achieved.

One advantage of performing the code smoothing using Equation (12) is that the terms $$\lambda_1\phi_1(t_k) + 2\frac{\lambda_1^2}{\lambda_2^2 - \lambda_1^2}(\lambda_1\phi_1(t_k) - \lambda_2\phi_2(t_k)) \tag{13}$$

and $$\lambda_2\phi_2(t_k) + 2\frac{\lambda_2^2}{\lambda_2^2 - \lambda_1^2}(\lambda_1\phi_1(t_k) - \lambda_2\phi_2(t_k)) \tag{14}$$

for the current epoch in Equation (12) can be evaluated before computing the smoothed ambiguities $\tilde{N}_{s1}$ and $\tilde{N}_{s2}$, since $\tilde{N}_{s1}$ and $\tilde{N}_{s2}$ need data from future epochs. Only after a complete satellite pass has been processed, it is necessary (and possible) to add back $\tilde{N}_{s1}$ and $\tilde{N}_{s2}$ as corrections.

Figure 7:
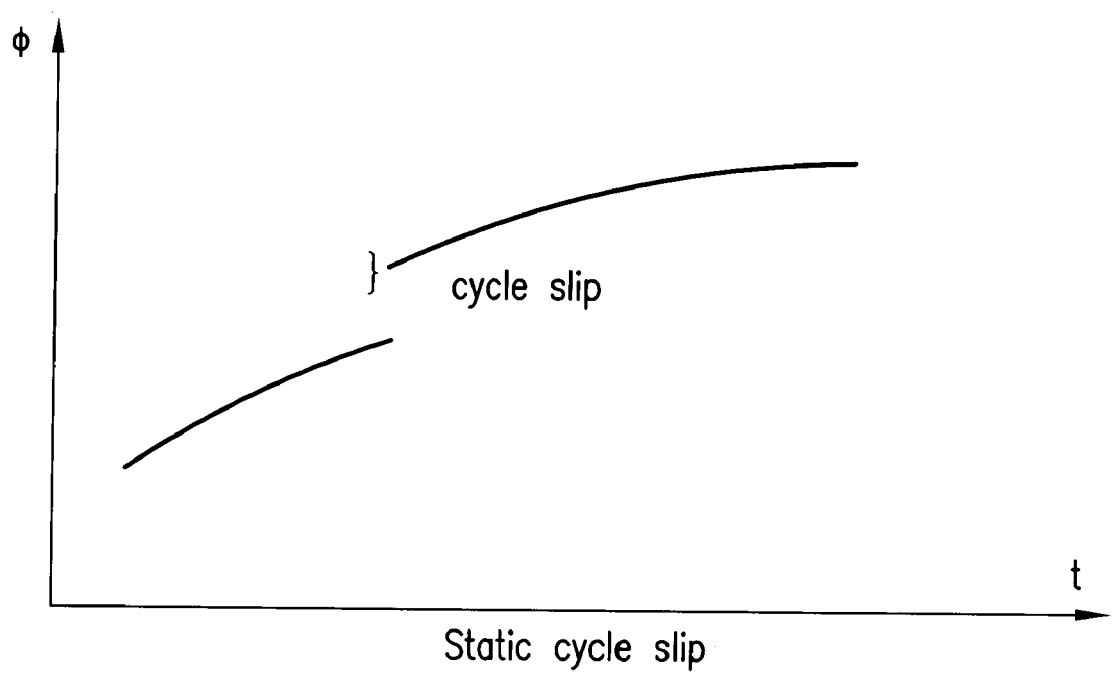
FIG. 7 illustrates the effect of a carrier-phase cycle slips causing a distinct jump in carrier-phase measurements.

Carrier-phase cycle slips can occur as a result of an interrupted carrier-phase tracking loop, causing a distinct jump in the carrier phase measurement, as shown in FIG. 7. Carrier-phase cycle slip can be detrimental to carrier phase positioning; for example, the above mentioned smoothing will suffer from cycle slips because every time there is a cycle slip, the right side of Equation (10) will change and thus the averaging of the left side of Equation (10) will then have to be reset, degrading the smoothing performance. If a cycle slip is encountered, the interpolation process also has to be reset and restarted, causing a loss of reference data for up to three epochs (the number of epochs to converge the Kalman filtered interpolator) of raw reference data (e.g., reference data is lost for 90 seconds if the reference data is at 30-second intervals). It is thus important to detect and repair these cycle slips. There are many prior art techniques for cycle slip repair. A detailed discussion on cycle slip detection and repair, ranging from carrier minus code, ionospheric residual and triple difference, is found for example at B. HOFMANN-WELLENHOF, GPS Theory and Practice, 2d. Ed., 1992, at Chapter 9. TEQC is a quality control check run by CORS which will show cycle slips in the reference-station data file. A rover receiver will also normally provide an indication of a cycle slip.

Figure 8:
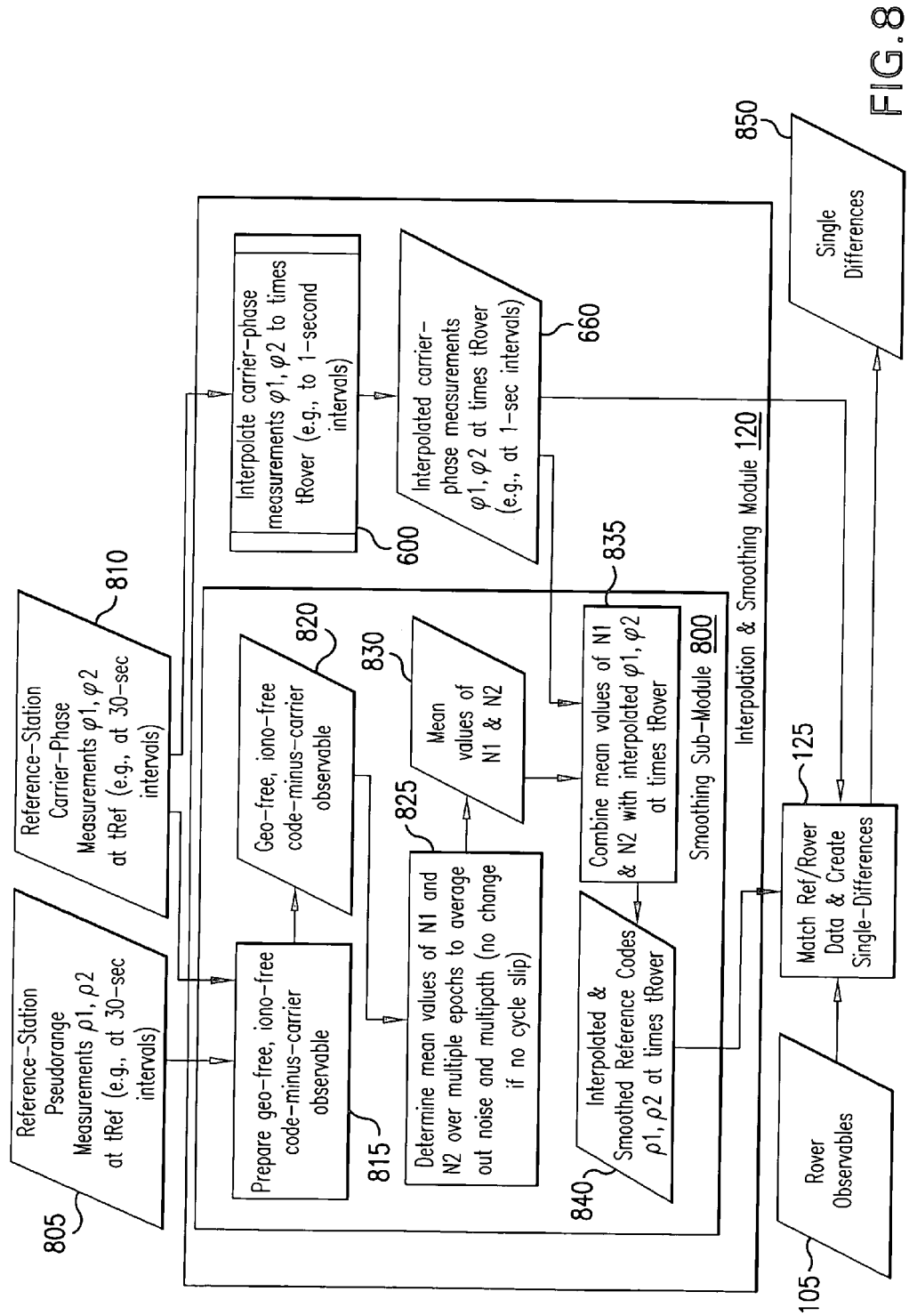
FIG. 8 illustrates in more detail portions of FIG. 1 in accordance with some embodiments of the invention.

FIG. 8 illustrates in more detail the interpolation and smoothing module 120, including a smoothing sub-module 800 in accordance with some embodiments of the invention. Reference-station pseudorange measurements 805 (e.g., at 30-second intervals) and reference-station carrier-phase measurements 810 (e.g., also at 30-second intervals) are combined at 815 to produce a geometry-free and ionosphere-free code-minus-carrier observable 820 for each carrier (L1 and L2). These observables, which are mainly multipath, noise and carrier-ambiguity, are each averaged over many epochs (for example, over many hours) at 825 to average out multipath and noise and produce a mean carrier-ambiguity for each carrier frequency at 830. The mean carrier-ambiguities 830 are combined at 835 with the interpolated carrier-phase measurements 660 (interpolated as discussed above, e.g., to 1-second intervals), to produce a set 840 of interpolated and smoothed reference codes at times matching the rover measurements (e.g., 1-second intervals).

Module 3: Match the Reference and Rover Data.

FIG. 8 also shows module 125 which matches the rover data 105 and the (interpolated and smoothed) reference data 840 at each epoch, and computes the single differences 850.

After this, differential processing can start. The next several sections will discuss innovative techniques developed for this purpose.

Module 4: Form the Minimum-Error-Combination Observations.

The reference data usually contain dual-frequency observables, L1 and L2. However the rover can provide either dual frequency or single frequency observables, depending on the configurations and the hardware. (For example, the Trimble GeoExplorer 2005 series and Trimble GPS Pathfinder ProXH and Trimble GeoXH handheld GPS receivers provide single-frequency observables when used with the internal antenna and provide dual-frequency observables when used with the optional external Zephyr antenna). Depending on the number of frequencies available (e.g., single- or dual-frequency for L1/L2 GPS), different observation combinations and parameterization schemes are formed. Regardless of the number of rover receiver frequencies, two types of observations are used in the final filtering: one code combination and one carrier phase combination.

Dual Frequency. If both L1 and L2 carrier-phase data are available, then two types of observation combinations are formed. The first is the so-called minimum-error code-minus-carrier geometry-free combination. The second is the minimum-error carrier-phase combination. These are expressed, respectively, as:

$$\rho_{cc} = a\lambda_1\phi_1 + b\lambda_2\phi_2 - (c\rho_1 + (1-c)\rho_2)$$

$$\phi_{cc} = a\lambda_1\phi_1 + b\lambda_2\phi_2 \quad (15)$$

Where
a: combination coefficient for L1 carrier phase
b: combination coefficient for L2 carrier phase
c: combination coefficient for L1 pseudo-range
$\rho_{cc}$: combined minimum error code minus carrier combinations
$\phi_{cc}$: combined minimum carrier combinations (with very long baseline, it tends to be ionosphere free combinations)

The coefficients are determined based on priori knowledge of the carrier phase noise, pseudo-range noise, baseline length, and ionospheric content. For very long baselines where the ionosphere becomes the dominant differential error source, the minimum-error combinations tend to be ionosphere-free combinations, on both carrier and code.

Figure 9:
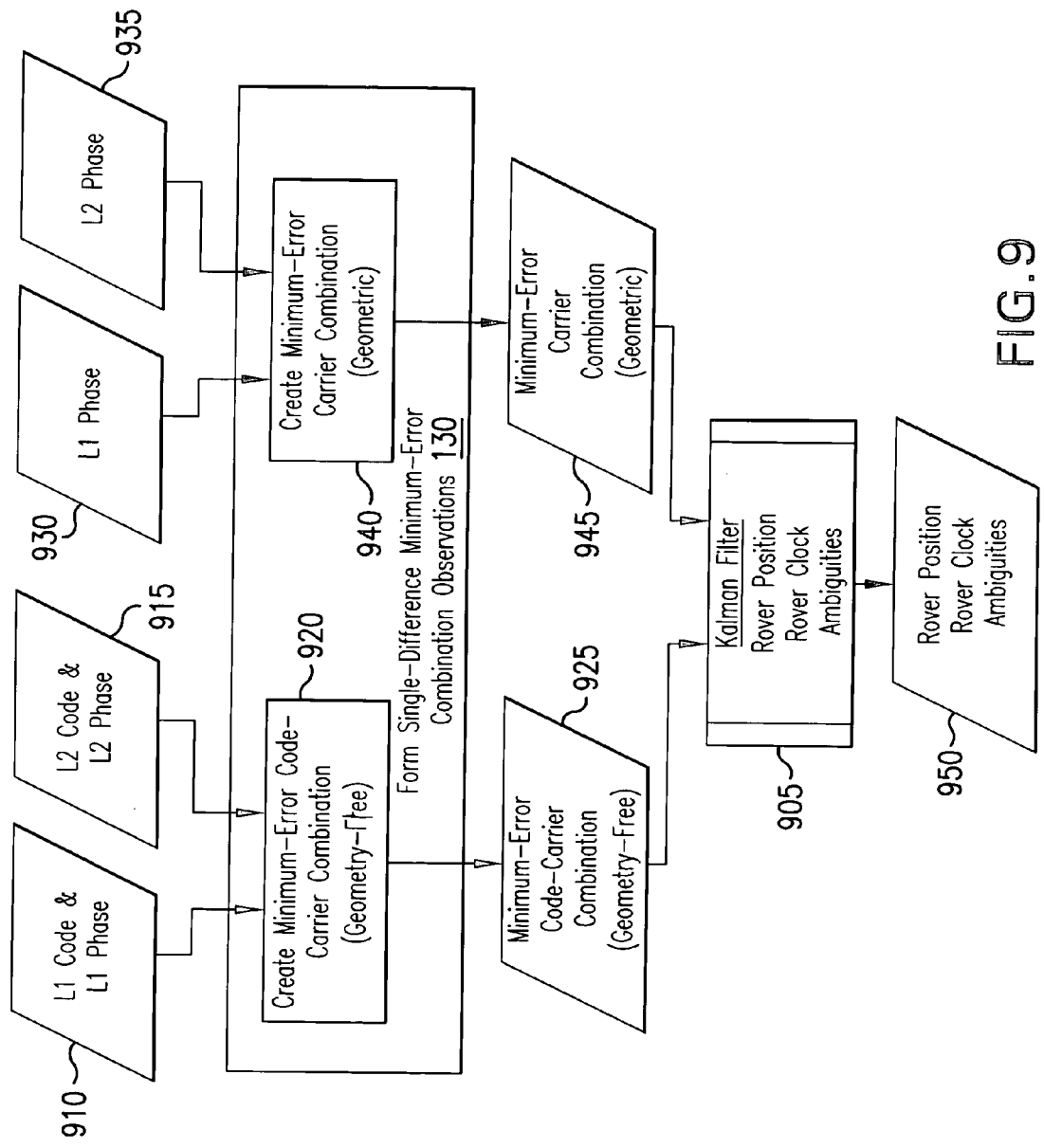
FIG. 9 shows an exemplary embodiment of a module which forms the minimum-error-combinations for dual-frequency GNSS data in accordance with some embodiments of the invention.

FIG. 9 shows an exemplary embodiment of a module 130 which forms the minimum-error-combinations for dual-frequency GNSS data and feeds these to a Kalman filter 905 which performs the filtering. L1 code and L1 phase data 910, and L2 code and L2 phase data 915 are supplied to a sub-module 920 which creates a geometry-free minimum-error code-carrier combination 925. L1 phase data 930 and L2 phase data 935 are supplied to a sub-module 940 which creates a geometric minimum-error combination 945. These combinations 925 and 945 are supplied to a static-mode Kalman filter 905 having states for Rover Position $x_1$, $y_1$, $z_1$
Rover Clock 1 $T_1$ (rover clock during epoch 1)
Rover Clock 2 $T_2$ (rover clock during epoch 2)
L1 ambiguities $N_{1-1} \ldots N_{1-N}$ (one per satellite for L1)
L2 ambiguities $N_{2-1} \ldots N_{2-N}$ (one per satellite for L2)

The filter's rover clock state is toggled between T1 and T2 from one epoch to the next. The ambiguities change only when reset due to cycle slip. The Kalman filter provides as outputs 950 the rover position values and the ambiguities.

In an alternate embodiment, the Kalman filter of FIG. 9 is enhanced for kinematic mode by adding further states for rover position and rover clock so that the states are Rover Position 1 $x_1$, $y_1$, $z_1$ (rover position during epoch 1)
Rover Clock 1 $T_1$ (rover clock during epoch 1)
Rover Position 2 $x_2$, $y_2$, $z_2$ (rover position during epoch 2)
Rover Clock 2 $T_2$ (rover clock during epoch 2)
L1 ambiguities $N_{1-1} \ldots N_{1-N}$ (one per satellite for L1)
L2 ambiguities $N_{2-1} \ldots N_{2-N}$ (one per satellite for L2)

The filter's rover clock state is toggled between T1 and T2 from one epoch to the next. When processing a current epoch, the Kalman filter keeps track of the rover position x, y, z for the epoch previously processed and determines whether the rover position has changed. When the rover has moved from the previous epoch, the rover position states are toggled between $x_1$, $y_1$, $z_1$ and $x_2$, $y_2$, $z_2$ to operate the filter in a kinematic mode. When the rover has not moved from the previous epoch, the rover position states are not toggled and the filter is thus operated in a static mode.

Figure 10:
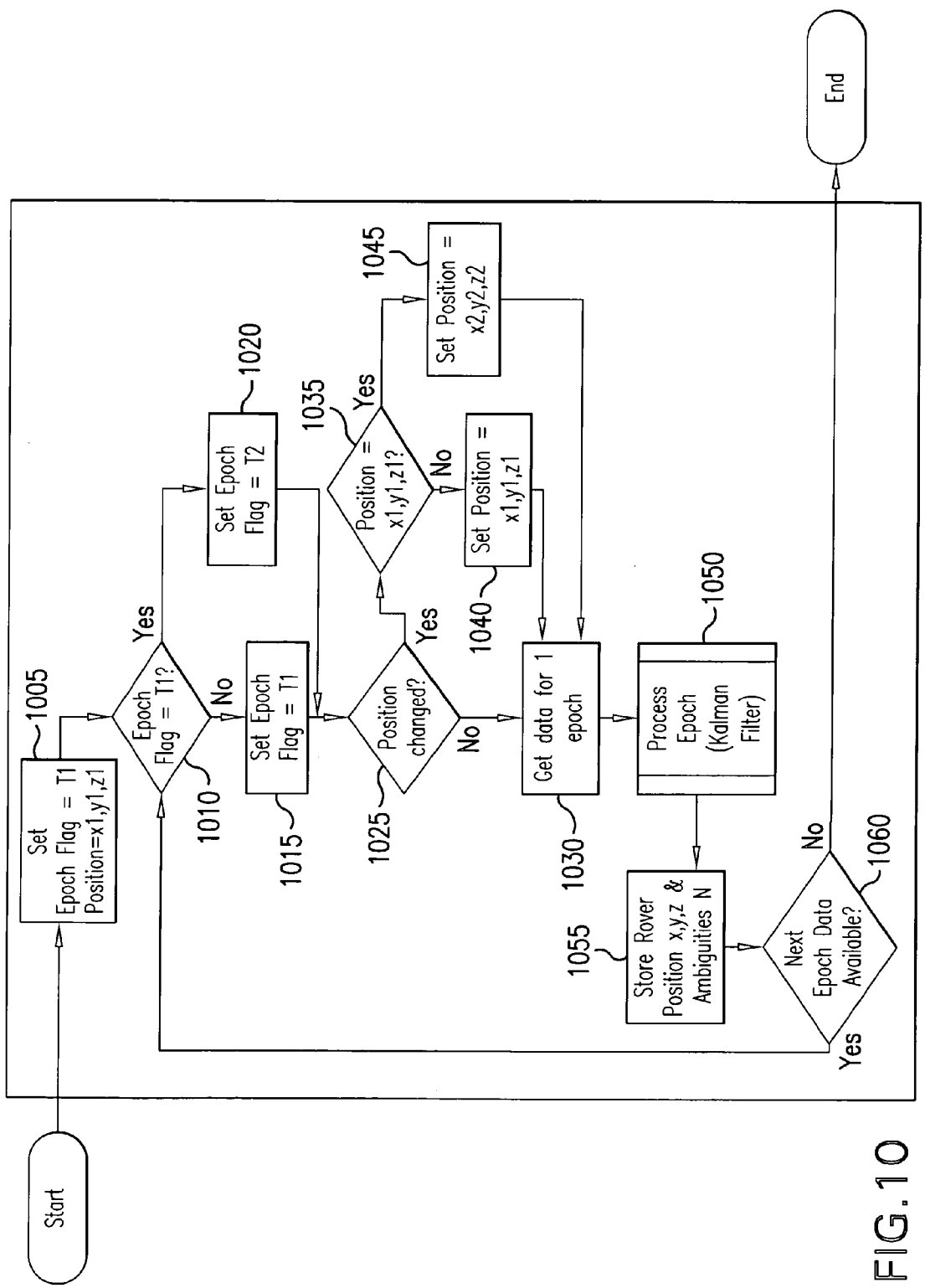
FIG. 10 is a flow chart showing operation of a Kalman filter with toggling of position and epoch in accordance with some embodiments of the invention.

FIG. 10 is a flow chart showing operation of Kalman filter 1005 with toggling of position and epoch in accordance with some embodiments of the invention. At 1005 an epoch flag (rover clock) is initialized to T1 and rover position is initialized to $x_1$, $y_1$, $z_1$. At 1010 the epoch flag is checked and, if not set to T1 is toggled at 1015 to T1. If at 1010 the epoch flag is set to T1 then it is toggled at 1020 to T2. At 1025 a check is made of the Kalman filter's position states to determine whether position has changed more than a predetermined amount. If no, then data for an epoch is retrieved at 1030. If yes, then at 1035 the position is checked and, if not set to $x_1$, $y_1$, $z_1$ it is set at 1040 to $x_1$, $y_1$, $z_1$. If position is found at 1035 to be set to $x_1$, $y_1$, $z_1$ then at 1045 it is toggled to "$x_2$, $y_2$, $z_2$". After toggling the position at 1040 or 1045, data for an epoch is retrieved at 1030. After retrieving data for an epoch at 1030, the epoch of data is processed at 1050 in a Kalman filter. The rover position and ambiguities are stored at 1055. At 1060 a check is made for a next epoch of data and, if available, the process returns to 1010.

Single Frequency. Single-frequency data means that the L1 carrier phase will be used as it is since no L2 carrier is available. However, for the L1 pseudo-range measurement, the $(\rho_1 + \lambda_1\phi_1)$ combination is used, which is ionosphere-free (but ambiguous), as contrasted with the classical $(\rho_1 - \lambda_1\phi_1)$ combination, which is not ionosphere-free. (The L1 phase plus L1 code combination is found to be ionosphere-free since the ionosphere error has the same magnitude but opposite sign on the L1 carrier and L1 code observations.) The $(\rho_1 + \lambda_1\phi_1)$ combination is known to be used in the context of single-point positioning (see Y. GAO et al., *High Precision Kinematic Positioning Using Single Dual-Frequency Receiver*, THE INTERNATIONAL ARCHIVES OF THE PHOTOGRAMMETRY, REMOTE SENSING AND SPATIAL INFORMATION SCIENCES, Vol. 34, Part XXX), and for triple-differenced positioning without floating solutions (see B. Remondi et al., Final Report: Investigation of Global Positioning System Single Frequency Hardware for the U.S. Environmental Protection Agency, EPA Reference DW13936132-01-0, April 1994, ten pages) but has not previously been proposed for differential positioning as in embodiments of the present invention.

Figure 11:
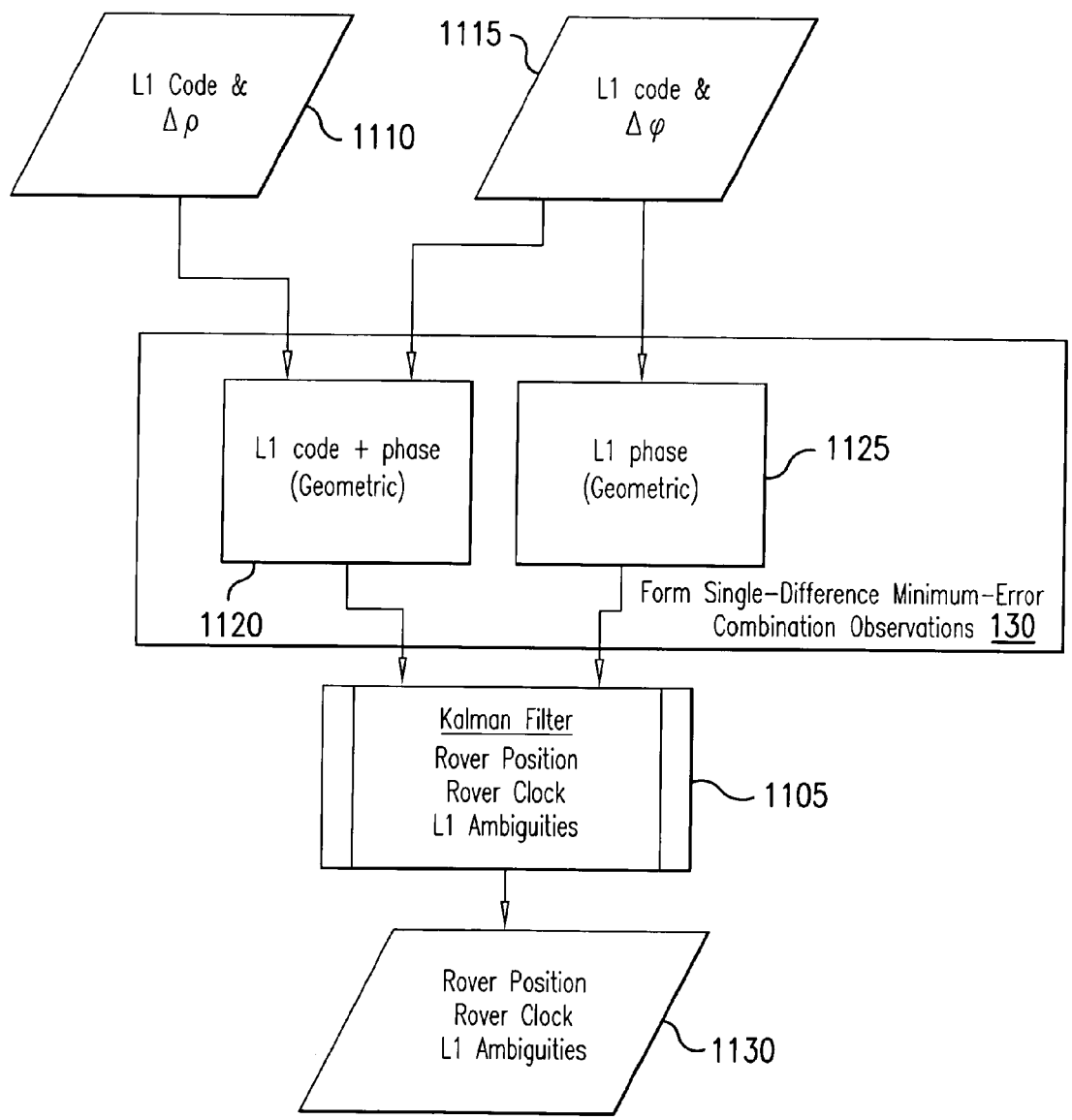
FIG. 11 shows an exemplary embodiment of a module which forms the minimum-error-combinations for single-frequency GNSS data in accordance with some embodiments of the invention.
Figure 12:
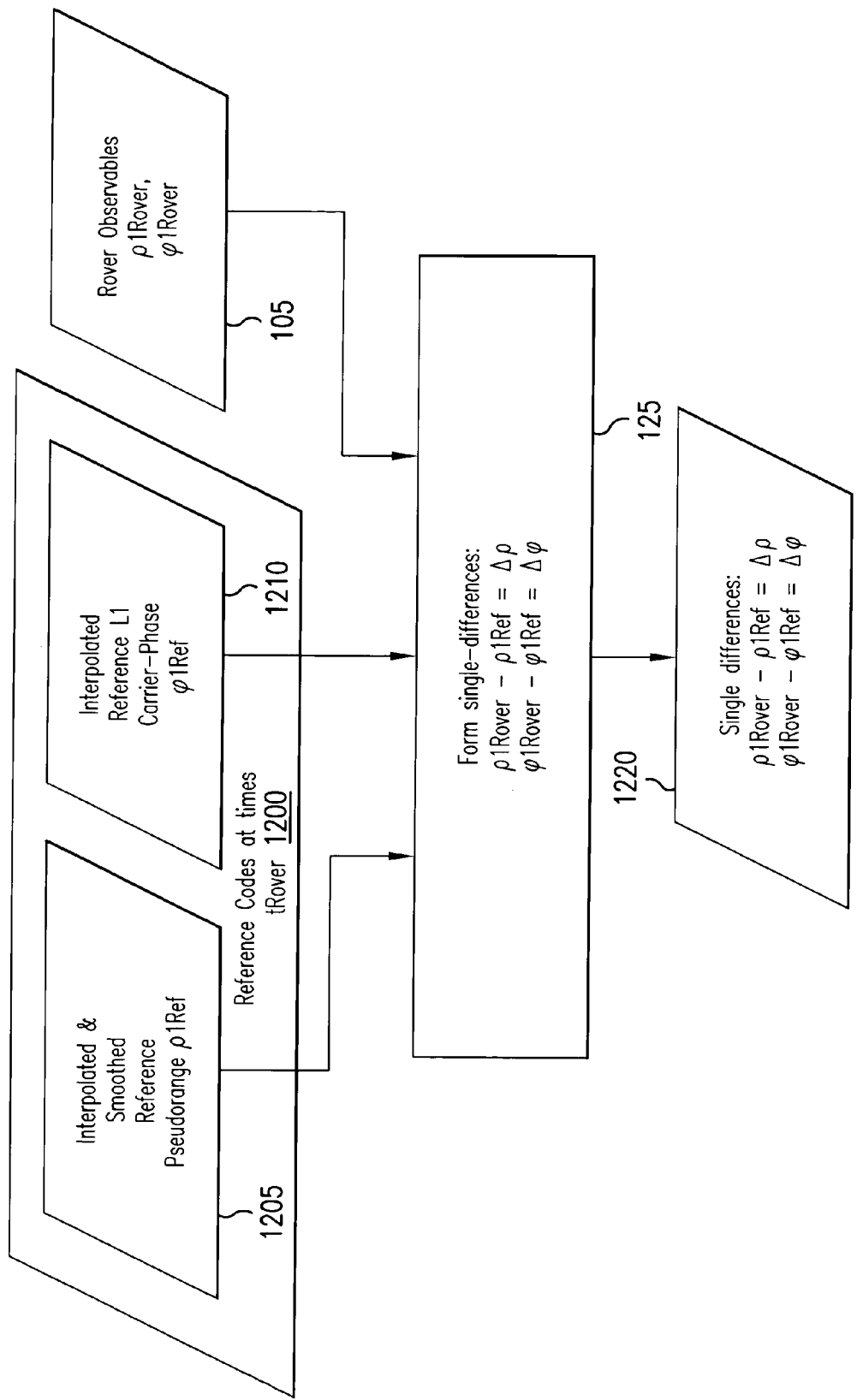
FIG. 12 shows in more detail the process of forming single differences for single-frequency GNSS data in accordance with some embodiments of the invention.

FIG. 11 shows an exemplary embodiment of a module 130 which forms the minimum-error-combinations for single-frequency GNSS data and feeds these to a Kalman filter 1105 which performs the filtering. Single-differenced L1 code and L1 phase data 1110 (single differences between rover data and interpolated and supersmoothed reference data) are supplied to a sub-module 1120 which prepares the geometric L1 code and phase combination. Single-differenced L1 phase data 1115, which is geometric, is supplied via an L1 phase sub-module 1125. The main error in the single-differenced L1 code plus L1 phase combination is multipath error, which is time-correlated, besides the a priori unknown (time-constant) ambiguity which is estimated by the Kalman filter. FIG. 12 shows in more detail the process of forming single differences for single-frequency GNSS data. Interpolated and smoothed reference pseudorange data 1205 and interpolated reference L1 carrier-phase data 1210 and the rover observables 105 are supplied to a process which forms single differences 1220 for pseudorange and for L1 carrier-phase.

The Kalman filter for single-frequency rover data is similar to the geometry filter described in U.S. patent application Ser. No. 10/696,528, except that it has two observables per epoch. (The reference data needs L2 for the supersmoothing process described below) The single-differences for code and L1 carrier are formed using reference data interpolated to match the rover data epochs. FIG. 11 illustrates formation of single differences for L1-only rover data.

The L1 code plus L1 phase differences and the L1 phase differences are supplied to a Kalman filter having states for Rover Position 1 $x_1, y_1, z_1$ (rover position during epoch 1)
Rover Clock 1 $T_1$ (rover clock during epoch 1)
Rover Position 2, $x_2, y_2, z_2$ (rover position during epoch 2)
Rover Clock 2 $T_2$ (rover clock during epoch 2)
L1 ambiguities $N_{1-1} \ldots N_{1-N}$ (one per satellite for L1)

The filter's rover clock state is toggled between $T_1$ and $T_2$ from one epoch to the next. When processing a current epoch, the Kalman filter keeps track of the rover position x, y, z for the epoch previously processed and determines whether the rover position has changed. When the rover has moved from the previous epoch, the rover position states are toggled between "$x_1, y_1, z_1$" and "$x_2, y_2, z_2$" to operate the filter in a kinematic mode. When the rover has not moved from the previous epoch, the rover position states are not toggled and the filter is thus operated in a static mode. The ambiguities change only when reset due to cycle slip. The Kalman filter provides as outputs the rover position values and the ambiguities. The flow chart of FIG. 10 also applies for toggling of position and epoch for the L1-only case; the Kalman filter states for processing L1-only rover data differ from those for processing of L1/L2 dual-frequency rover data (for L1-only the ambiguities are L1 and for dual-frequency the ambiguities are minimum-error L1/L2 combination; see U.S. patent application Ser. No. 10/696,528 and L. SJÖBERG, *The best linear combinations of L1 and L2 frequency observables in the application of Transit/Doppler and GPS*, MANUSCRIPTA GEODETICA 15, 1990, pp. 17-22).

Module 5: Prepare a Backward Estimate of the Position and Ambiguity; Module (6): Prepare a Forward Estimate of the Position and Ambiguity GPS carrier and code observations include not only white noise, but also colored noise (non-Gaussian errors), for example, multipath. Multipath error on the code observations can be up to tens of meters and on the carrier phase can be up to several centimeters. The multipath errors typically have a time constant of tens of seconds. To achieve the highest processing accuracy, the multipath should be properly accounted for. There are two ways to take care of this. The first is via state augmentation where an additional multipath state is estimated in the Kalman filter; the second is the whitening of noise technique, where the observation of the current epoch is differenced with the observation of the previous epoch via a correlation coefficient. The first method is more expensive from a computational load perspective and is thus not preferred. The second has proven its efficiency.

The basic principle of this whitening of noise technique is demonstrated as follows. Assuming the GPS carrier phase observation at epoch $t_0$ is $L_0$ and at epoch $t_1$ is $L_1$, and the multipath on the carrier phase is found to be a first order Gauss-Markov process having a time constant of $t_c$, then the following differenced observation is found to be white:

$$\phi'_1 = \phi_1 - e^{\frac{t_1 - t_0}{t_c}} \phi_0 \quad (16)$$

By properly taking into account the stochastic nature of the multipath, the algorithm provides optimal position accuracies and reduces the Kalman filter's convergence time by reducing the number of filter states to 8 plus N (where N is the number of satellites) from the 4 plus 4N states of the conventional Kalman filter approach.

One implication of this whitening of noise technique is that since the observation contains observation not only from this epoch, but also from the prior epoch, the estimated states also have to contain not only the position states (x,y,z) from this epoch, but also position states from previous epoch. So the complete state vector is:

$$(x_1, y_1, z_1, t_1, x_0, y_0, z_0, t_0, N_1, N_2 \ldots N_n) \quad (17)$$

Where $x_1, y_1, z_1, t_1$: rover position & rover clock error states of current epoch $x_0, y_0, z_0, t_0$: rover position & rover clock states of previous epoch $N_1, N_2 \ldots N_n$: ambiguity states for satellite 1 to satellite n.

Module 7: Smoothing Positions

After the data have been processed in both forward and backward mode, an additional estimation step can be taken on the forward/backward processed results, known as smoothing. Smoothing is generally well known as an estimation technique in GNSS. An introduction to smoothing techniques is found in A. GELB, APPLIED OPTIMAL ESTIMATION, MIT Press, 1974, at Chapter 5, *Optimal Linear Smoothing*.

Although a goal is to achieve two-decimeter accuracy with two minutes of data collected at a rover position, it is rare that a user will log only two minutes of data during a survey. Often what happens in the field is that the user will occupy a feature for some time, such as two minutes, and then keep the satellite tracking (which is important, as it keeps the ambiguity information) while moving to the next feature point to be logged. As long as satellite tracking is not interrupted, there is a possibility to use the future ambiguity information (ambiguities of a succeeding epoch) for current position estimate (processing of a current epoch) during post-processing. The smoothing idea is based on this continuous satellite and ambiguity tracking. It uses all the information available from the entire survey, not just the data up to the current epoch.

Figure 13:
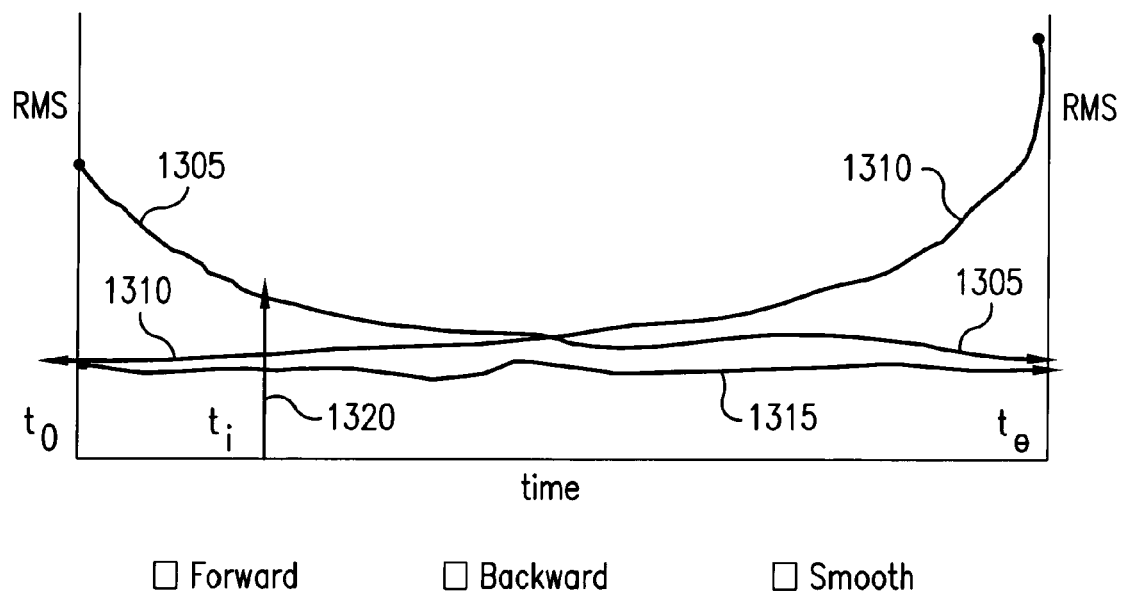
FIG. 13 illustrates the effect of forward and backward smoothing in accordance with some embodiments of the invention.

FIG. 13 illustrates the effect of smoothing over a period from to to $t_e$. Curve 1305 shows the convergence of the position RMS with respect to the satellite tracking time in forward filtering; the RMS decreases with more data (longer satellite tracking time). The result of the forward processing is $$C_{pf}, C_{af}, C_{paf}, p_f, a_f \quad (18)$$

where $a_f$: forward ambiguity estimate
$p_f$: forward position estimate
$C_{af}$: forward ambiguity variance-covariance (VC) matrix
$C_{pf}$: forward position VC matrix
$C_{paf}$: forward position ambiguity covariance matrix Curve 1310 shows the RMS convergence when the data is processed in the reverse direction (backward filtering). The RMS also decreases with more data. The result of the back processing is $$C_{pb}, C_{ab}, C_{pab}, p_b, a_b \quad (19)$$

where
$a_b$: backward ambiguity estimate
$p_b$: backward position estimate
$C_{ab}$: backward ambiguity variance-covariance (VC) matrix
$C_{pb}$: backward position VC matrix
$C_{pab}$: backward position ambiguity covariance matrix The almost level line 1315 shows the smoothed RMS. The smoothing is done as follows:

$$a_s = (C_{ab}^{-1} + C_{af}^{-1})(C_{af}^{-1} a_b + C_{ab}^{-1} a_f)$$

$$p_s = p_b - C_{pab}' C_{ab}^{-1} (a_b - a_s) \quad (20)$$

Where
$a_s$: as smoothed ambiguity estimate
$p_s$: smoothed position estimate

The advantage of smoothing is demonstrated by the fact that namely the smoothed position precision $$C_{ps} < C_{pf}, C_{pb} \quad (21)$$

Where
$C_{ps}$: smoothed position VC matrix
is better than both forward and back processing alone. Plot 1315 shows that the smoothed position accuracy is substantially evenly distributed for the entire survey, because it uses all the ambiguity information (before and after the epoch currently being processed), not just past ambiguity information as in real-time processing. This offers a big advantage to the user if satellite tracking is not interrupted when moving between feature points. The user may only occupy a feature point for two minutes near the beginning of the survey, e.g., at a time $t_1$, but if the survey is continued for a substantial time (such as one hour) without interrupting satellite tracking, the computed position for that feature point after the smoothing will be more accurate than with just the forward-filtering results.

Figure 14:
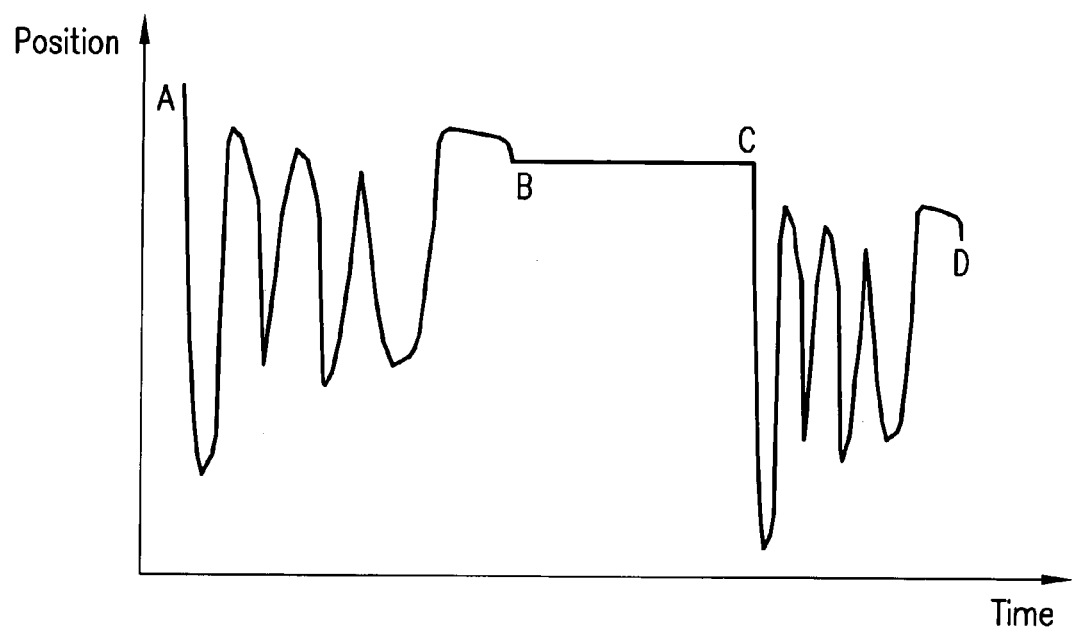
FIG. 14 illustrates the use of smoothing for stop-and-go processing in accordance with embodiments of the invention.

The smoothing also supports stop-and-go processing. FIG. 14 illustrates the scenario. In the time interval from point A to point B the rover is in motion, the curve in this region representing a kinematic session. From point B to point C the rover is static. From point C to point D, the rover is in motion again, representing a kinematic session. First the backward processing is done. During the static occupation period from C to B, only ambiguity, position information (state estimate, variance-covariance matrix) at epoch B is stored, all previous results (from C to B) are discarded. Next, the forward processing is performed, starting from epoch A to B. Before processing data at epoch B, the smoothing can be done with the stored backward processing results (position, ambiguity, states and Variance-Covariance matrix); the forward processing results from applying Equation (20).

Detection of Rover Movement During Static Periods:

Detection of rover movement is possible during periods reported by the user as static. In many cases the user provides wrong stop-and-go information. This means that the rover is moving during a period in which the user has reported the rover to be static. Naturally this will cause a large error in the resulting static position computed with the post-processing engine. To solve this problem, rover movement can be detected, by checking the given stop-and-go intervals for static outliers before the engine processes these intervals in static mode.

A straightforward approach would be to compute all positions in kinematic mode. Then the differences of consecutive epochs would be inspected to detect movements. As the positions very much depend on the ambiguity estimates at the specific epoch (influenced by filter convergence and rising/setting/slipping satellites), the accuracy of those differences is generally not very good (decimeter-range as shown in by the upper curve 1505 in FIG. 15). To become independent of ambiguity estimates, cycle slips and constellation changes, another prior art method is the so called "delta-phase method". Here, the position difference between two epochs is estimated directly from the phase measurement differences of the same two epochs. The difference contains no ambiguity if there has been no cycle slip.

In accordance with embodiments of the invention, the Kalman filter states already include the rover positions of the current epoch and the previous epoch (see Equation (17) above). These are provided for the "whitening of noise" technique to model multipath and residual ionosphere as discussed above. These positions can be used to directly compute the estimated motion of the rover between the two latest epochs, both for the forward- and the backward-processing (see the two lower plots of FIG. 10), using the relation $$\dot{r} = \frac{|\vec{r}(t_i) - \vec{r}(t_{i-1})|}{t_i - t_{i-1}} \quad (22)$$

where $\vec{r}(t_i) = (x_i, y_i, z_i)$ is the position at the current time $t_i$ and $\vec{r} = (t_{i-1}, x_{i-1}, y_{i-1}, z_{i-1})$ is the position at the previous time $t_{i-1}$. The current position is computed from the previous position using the decorrelated delta-phase observable $\phi(t_i) - \alpha\phi(t_{i-1})$, with the decorrelation-coefficient $\alpha$.

Figure 15:
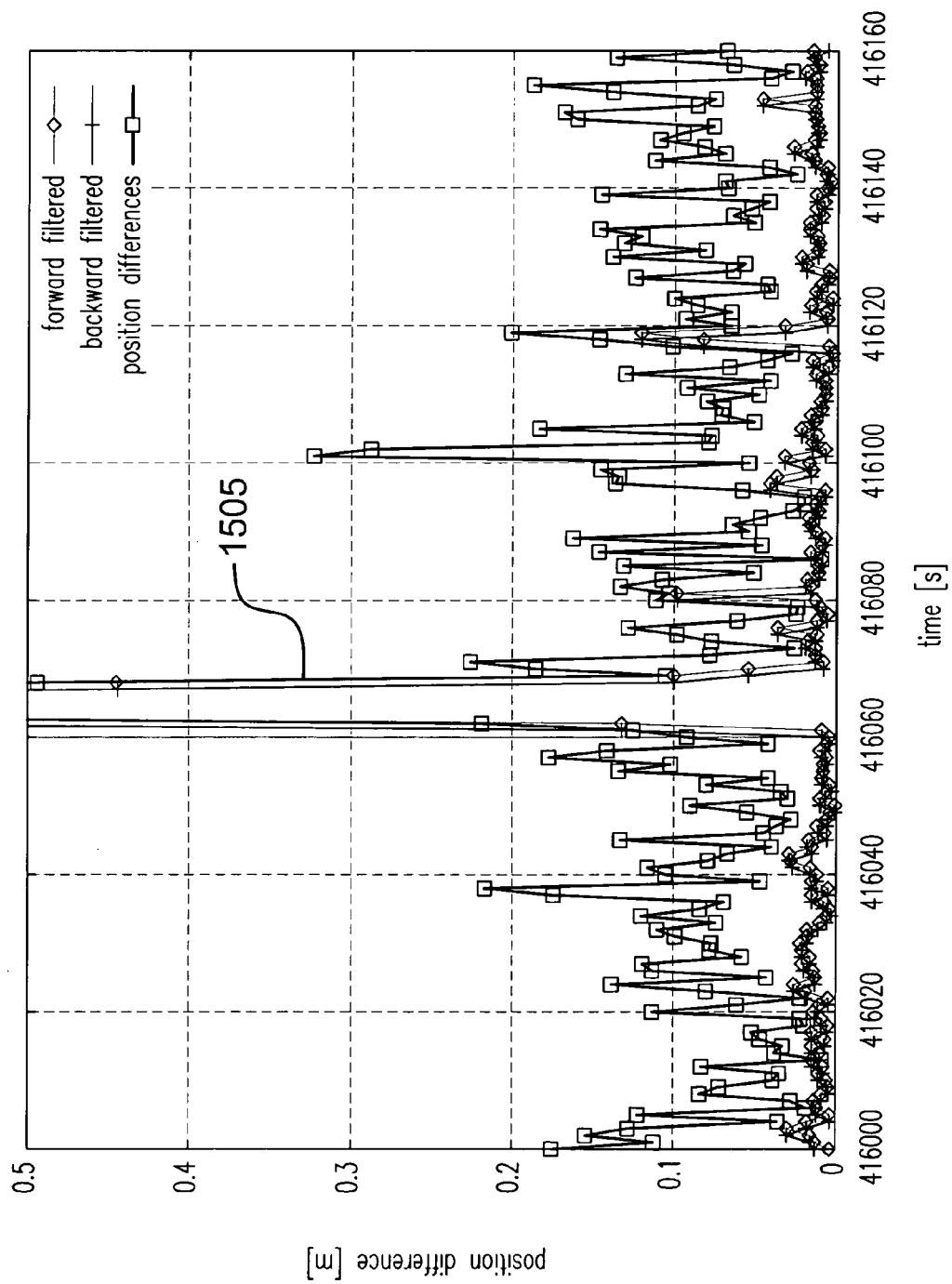
FIG. 15 illustrates the benefit of forward and backward smoothing for processing of kinematic data in accordance with some embodiments of the invention.

Comparison with the upper plot of FIG. 15 shows the great improvement in sensitivity of this motion detection method. Velocities of about 5 cm/s or greater can be detected and reliably separated from the noisy background. If in a given stop-and-go interval $\dot{r} > 0.3$ m/s (for example as in FIG. 15) the interval is marked as invalid or non-static. The entire interval is then processed in kinematic mode, or the longest static sub-interval is determined and processed in static mode.

Multi Baseline Adjustment (MBA)

In accordance with some embodiments of the invention, MBA improves differential-correction accuracy by averaging the position-determination results from several different baselines. This technique can provide higher accuracy than any single baseline. It also has several advantages over typical network modeling methods: it works well over long baseline distances, is more tolerant of imprecise base coordinates, and is suited to ad-hoc combinations of base stations.

Disadvantages of VRS for long baselines (>300 km). Differential correction is performed by applying corrections to the satellite measurements collected at the roving GNSS (e.g. GPS) receiver. These corrections are determined in one of two ways. A single, stationary GPS base station at a known coordinate can be used to calculate the corrections. Or a network modeling method may be used, which uses a number of base stations around the area, and uses their known coordinates and their satellite measurements to create a model of the various error components over the relevant period of time. This model is then used to interpolate the corrections at the rover positions, which are then applied. This network modeling technique is also known as a VRS (Virtual Reference Station).

A VRS provides more accurate corrections than a single base station. However there are some disadvantages. Usually the base stations cannot be too far apart: 70 km is the limit for RTK-VRS (real-time kinematic virtual reference station), and 300 km for DGPS-VRS (differential GPS virtual reference station). The reference positions of the base stations must be very accurately known; otherwise the model can fail to initialize. The rover should be well inside the coverage area of the base station model, but this is not always possible, for example on a coast. Also, the network of base stations takes time to configure and initialize, and so is not suited to ad-hoc use. Lastly, the modeling requires preferably 5 base stations, but in many locations there are fewer available. Multi-baseline adjustment has none of those disadvantages.

MBA method. Given m reference stations, for each reference station i={1, . . . , m} a corrected position with the coordinates $(\phi_i, \lambda_i, h_i)$ can be computed using an embodiment of the post-processing engine described herein. To reduce the deviation from the true position $(\phi_0, \lambda_0, h_0)$, these corrected positions can be averaged, using a weighting function proportional to the quality of the positions. Usually the quality depends on the number of satellites tracked ($n_{sat}$), PDOP (positional dilution of precision), distance (baseline-length), number of epochs of valid data, RMS of the residuals, etc. Some or all of these quantities are used in the post-processing engine to estimate the covariance for each coordinate (see Equation (21)). A good choice for the weighting function is thus the inverse covariance $1/\sigma^2$. The averaged latitude $\bar{\phi}(t_j)$, longitude $\bar{\lambda}(t_j)$ and height $\bar{h}(t_j)$ at the epoch $t_j$ are then $$\bar{\varphi}(t_j) = \frac{1}{\sum_{i=1}^{m} w_i} \sum_{i=1}^{m} w_i \varphi_i(t_j), \quad (23)$$

$$w_i = \frac{1}{\sigma_i(\varphi_i)^2}$$

$$\bar{\lambda}(t_j) = \frac{1}{\sum_{i=1}^{m} w_i} \sum_{i=1}^{m} w_i \lambda_i(t_j), \quad (24)$$

$$w_i = \frac{1}{\sigma_i(\lambda_i)^2}$$

$$\bar{h}(t_j) = \frac{1}{\sum_{i=1}^{m} w_i} \sum_{i=1}^{m} w_i h_i(t_j), \quad (25)$$

$$w_i = \frac{1}{\sigma_i(h_i)^2}$$

Figure 16:
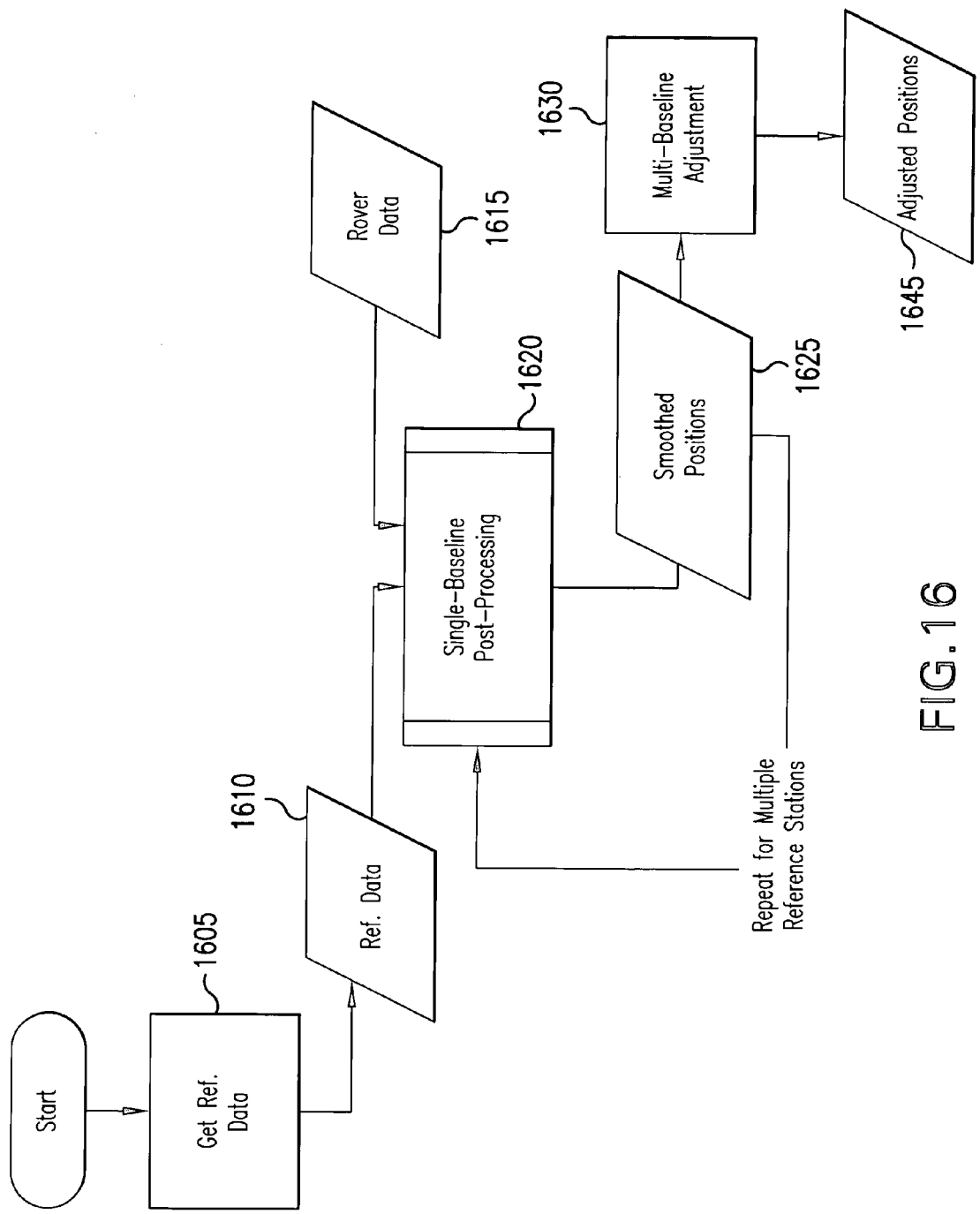
FIG. 16 shows an overview of a multi-baseline adjustment process in accordance with some embodiments of the invention.

FIG. 16 shows an overview of an MBA process 1600 in accordance with some embodiments of the invention. At 1605 reference data 1610 from multiple reference stations is retrieved for post-processing with rover data 1615. At 1620 a single-baseline process is repeated for each of the reference stations to prepare a set of smoothed positions 1625 for each reference station. Smoothed positions 1625 are then averaged in an MBA process 1630 to produce adjusted positions 1645.

Figure 17:
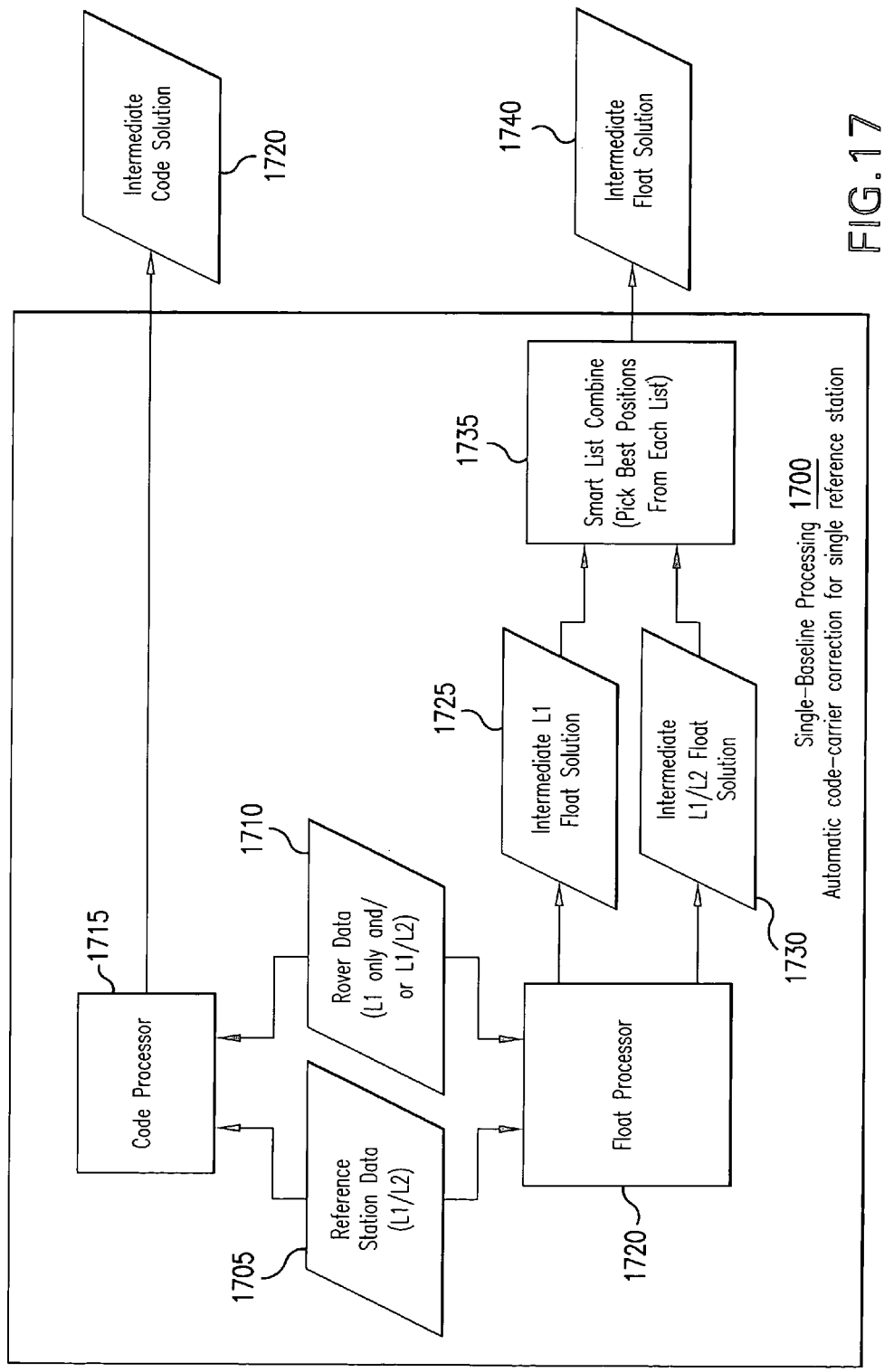
FIG. 17 is an overview of single-baseline processing with automatic code-carrier correction in accordance with some embodiments of the invention.

FIG. 17 is an overview of single-baseline processing with automatic code-carrier correction 1700 in accordance with some embodiments of the invention. Reference-station data 1705 and rover data 1710 (L1 one and/or L1/L2) are supplied to a code processor which produces an intermediate code solution 1720. Reference-station data 1705 and rover data 1710 (L1 one and/or L1/L2) are supplied to a float-solution processor 1720 which produces an intermediate L1 float solution 1725 and, if dual-frequency rover data is available, an intermediate L1/L2 float solution 1730. A module 1735 combines the results of 1725 and 1730 by selecting the best solution at each epoch to produce an intermediate float solution 1740.

Figure 18:
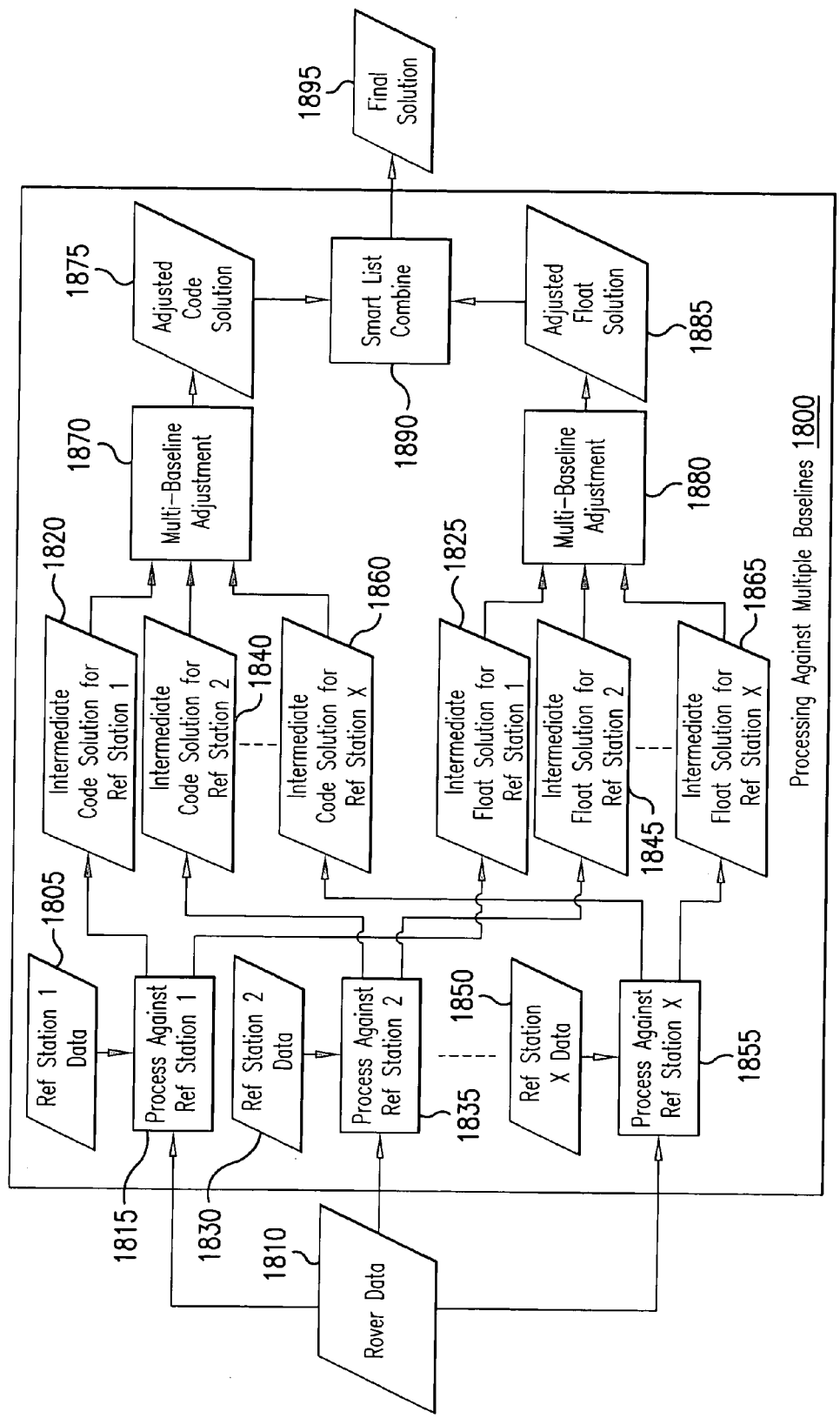
FIG. 18 is an overview of multi-baseline adjustment in accordance with some embodiments of the invention.

FIG. 18 is an overview of multi-baseline adjustment 1800 in accordance with some embodiments of the invention. Data 1805 from a first reference station and rover data 1810 (L1 one and/or L1/L2) are supplied to a processor 1815 which produces an intermediate code solution 1820 for reference station 1 and an intermediate float solution 1825 for reference station 1. Data 1830 from a second reference station and rover data 1810 (L1 one and/or L1/L2) are supplied to a processor 1835 which produces an intermediate code solution 1840 for reference station 2 and an intermediate float solution 1845 for reference station 2. Data 1850 from an X-th reference station and rover data 1810 (L1 one and/or L1/L2) are supplied to a processor 1855 which produces an intermediate code solution 1860 for reference station X and an intermediate float solution 1865 for reference station X. Intermediate code solutions 1820, 1840 and 1860 are supplied to an MBA process 1870 to produce an adjusted code solution 1875. Intermediate float solutions 1825, 1845 and 1865 are supplied to an MBA process 1880 to produce an adjusted float solution 1885. A module 1890 combines the best solutions from adjusted code solution 1875 and adjusted float solution 1885 by selecting the best solution at each epoch to produce a final solution 1895.

Part 2: Post-Processing Accuracy Predictor (PPA)

When collecting GNSS data, it is often useful to know the accuracy of the determined position. Existing GPS receivers output an estimate of the accuracy of the position calculated at each epoch (the 'real-time accuracy estimate'). But many users perform post-processed differential correction to improve the accuracy of the GPS positions. Therefore, the real-time accuracy estimate is not a good indication of the accuracy that will be achieved later. For example, the receiver may be calculating autonomous positions, or may be applying differential corrections to code solutions, whereas the post-processor may be calculating a more accurate carrier-phase solution.

Some embodiments of the invention solve this problem by supplying, at time of measurement, a prediction of the accuracy that will be achieved later after post-processing. This is very useful to the user to optimize productivity when a certain threshold of accuracy is required. It is very costly to re-visit a site if required accuracy is not achieved; likewise it is unproductive to collect GPS measurements at a point for longer than necessary.

Post-processing accuracy (PPA) prediction in accordance with embodiments of the invention is particularly useful when carrier float solutions are to be calculated during post-processing. Their accuracy increases according to the duration for which measurements are continuously collected (in contrast to code solutions which have roughly similar accuracy regardless of tracking duration). For example, the Predicted Post-processed Accuracy indicator answers the question "How long do I have to stand here to get the 25 cm post-processed accuracy that my boss requires?".

In accordance with some embodiments of the invention, post-processing accuracy is predicted during data collection using a look-up table in which the input variables include one or more of: duration since carrier lock was acquired; HDOP (horizontal dilution of precision), number of GNSS satellites being continuously tracked; and whether single or dual frequency carrier data is being logged. These parameters are fed into a function that looks up a PPA value from a pre-defined table. The values in the table have been assigned as a result of prior test processing with said parameters. Other input variables can also be used, such as PDOP instead of HDOP, and the knowledge of whether the antenna is static or moving. Predicted accuracy in accordance with some embodiments is horizontal RMS (root mean square). The same techniques can be used to predict vertical accuracy, for example with different input variables such as VDOP (vertical dilution of precision).

The above methods are primarily aimed at predicting post-processed float solutions, which increase in accuracy according to collection duration. But the concept can be generalized to work with other types of differential correction, such as code solutions. Code solutions tend to be independent of the duration of measurement. So the lookup table values will vary less over time, or may be simplified to omit the duration variable altogether.

The above methods predict the accuracy of a single baseline, i.e., using a single GNSS base station for differential correction. But accuracy can be improved by using data from multiple base stations in an averaging technique or an area network model. Thus the accuracy prediction can be further improved by adding additional inputs about the post-processing that will be performed later, such as whether single or multiple baselines will be used, their number, their distance from the rover GNSS receiver, and their geometry around the rover GNSS receiver.

The receiver calculates during data collection an estimate of the accuracy likely to be achieved after post-processing. This helps to optimize productivity when collecting GNSS data for which post-processed accuracy is important. For example, the predictor answers the question "How long do I have to stand here to get the 20 cm post-processed accuracy I need?" The predictor examines the quality of carrier measurements and estimates how well the post-processed float solution will converge in the time since carrier lock was obtained.

In one embodiment, a PPA predictor program uses a lookup table approach. GNSS data is processed using the post-processing engine, and the positioning errors are binned according to feature occupation time, HDOP and # of satellites, separately for the single- and the dual-frequency case. For each bin, a least squares fit is then performed to generate an analytical function that best fits the predicted position error, the feature occupation time, HDOP and the number of satellites tracked, separately for the single- and the dual-frequency case. A PPA predictor program having a lookup table based on this analytical function runs, for example, in the receiver data controller of a rover receiver such as the Trimble GeoExplorer 2005 series handheld GPS receiver or other receivers mentioned above.

Figure 19:
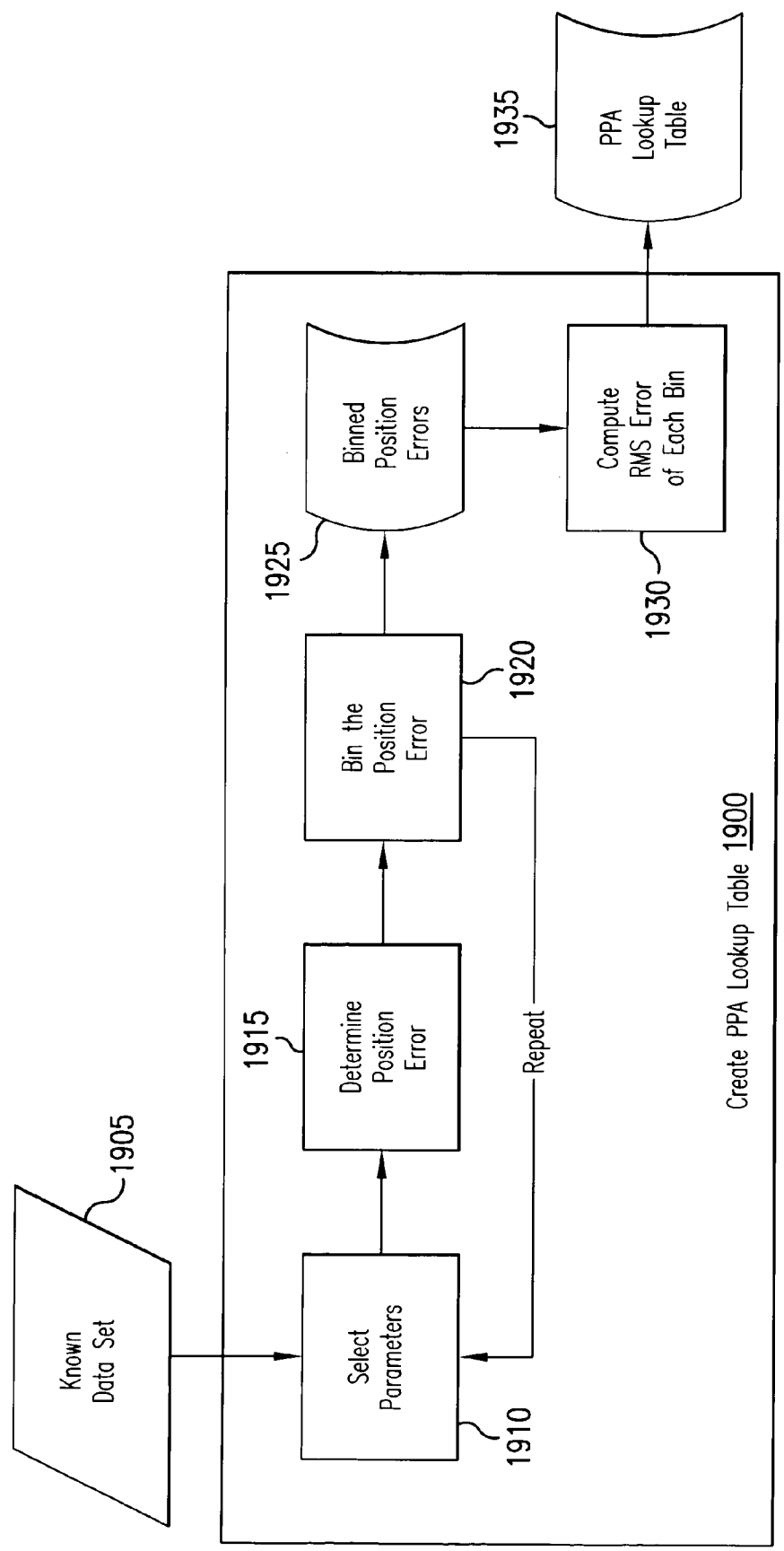
FIG. 19 is an overview of an exemplary process for creating a lookup table useful for post-processing-accuracy determination in a rover in accordance with some embodiments of the invention.

FIG. 19 is an overview of an exemplary process 1900 for creating a lookup table useful for PPA determination in a rover. GNSS measurement data 1905 is collected in advance with the rover at a known position for an extended period (e.g., 24 hours) and this data is stored for use in preparing the lookup table. The data preferably includes L1 and L2 observations using, e.g., a Trimble handheld receiver with external antenna. The lookup table is prepared by selecting at 1910 a subset of the data, using this subset to compute at 1915 differentially-corrected position and position error and HRMS (e.g., using reference-station data and a PP engine as described above), and binning the results at 1920. Steps 1910, 1915 and 1920 are repeated for multiple subsets of the data to produced a set of binned results 1925. The binned results are parameterized at 1930 by computing an RMS (or HRMS) error for each bin. The parameterized results are stored in a PPA lookup table 1935.

Figure 20:
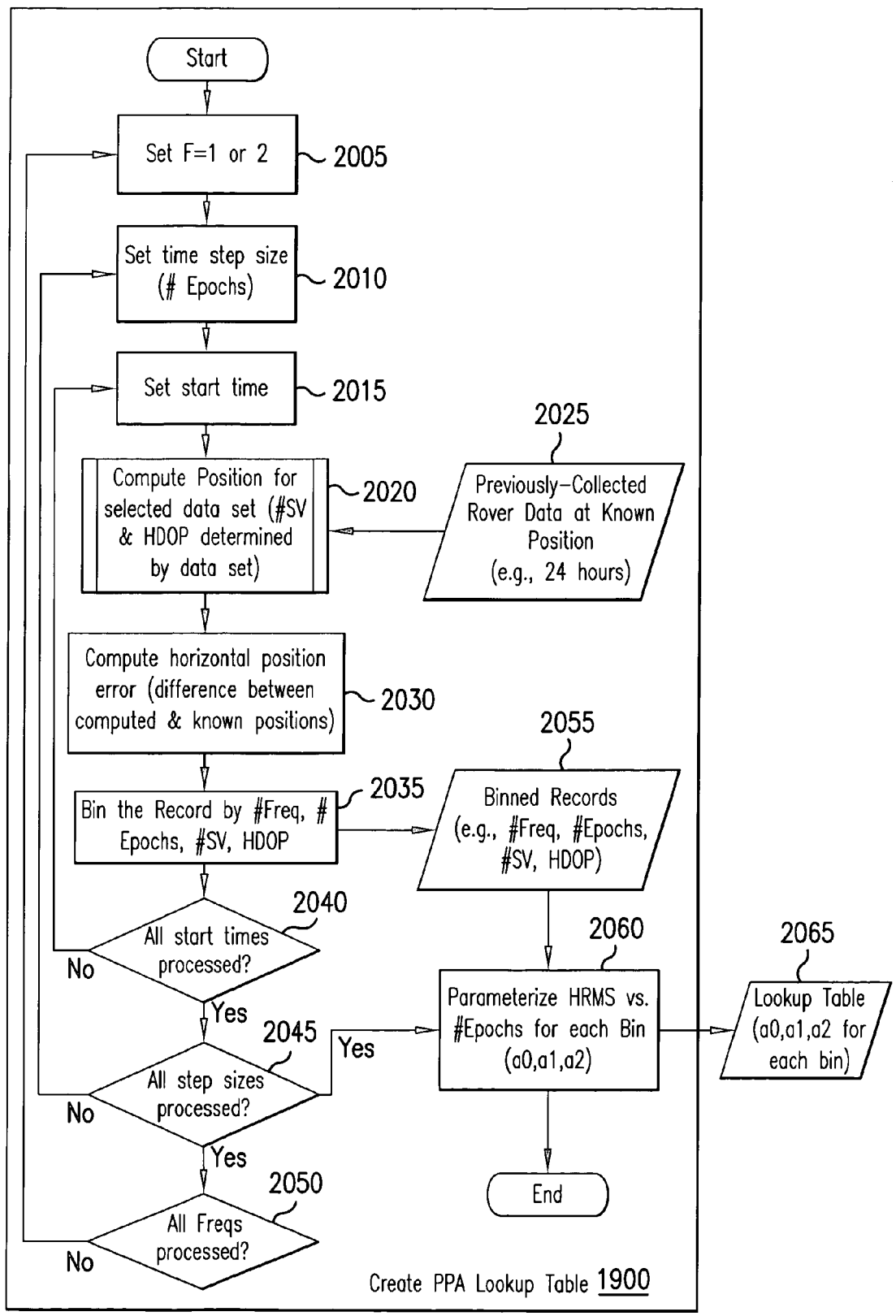
FIG. 20 shows a process for creating a PPA lookup table in accordance with some embodiments of the invention.

FIG. 20 shows a more detailed view of a process 2000 for creating a PPA lookup table. At 2005, the number of frequencies is selected, e.g., L1 single frequency or L1/L2 dual frequency. At 2010, the time-step size is selected, e.g., the number of epochs of data to be used in computing position. At 2015 a start time is selected for the data to be used in computing position, e.g., the epoch of data from which to start the position computation. At 2020, position is then computed from a subset of rover data 2025 (e.g. 24 hours of previously-collected rover data), the subset being defined by the number of frequencies, the number of epochs, and the starting epoch. At 2030, error between computed position and known position is then computed, e.g., HRMS (horizontal root mean square) error is computed from the latitude and longitude errors. (Alternately, height may also be included in computing a three-dimensional RMS position error if desired.) At 2035 the resulting record is binned according to number of frequencies, number of epochs, number of satellites observed during the processed interval, and HDOP (or PDOP if three-dimensional). Bin sizes are, for example, 0.5 for HDOP and 25 seconds for time (e.g., 25 epochs of 1 second per epoch).

The process is repeated at 2040 for multiple starting times (starting epoch) so that records are obtained for multiple numbers of satellites tracked and various HDOP values. At 2045 the step size (number of epochs) is incremented, and the processing is repeated for multiple starting times. Step sizes can vary, for example, from 10 seconds (10 epochs) to 600 seconds (600 epochs). When all records have been acquired for one frequency setting (e.g. L1 single frequency), then the process repeats for another frequency setting (e.g., L1/L2 dual frequency). It will be seen that this process generates a large set of binned records 2055. The following table illustrates an exemplary structure of the binned records:

| Freq | Epochs | Sats | HDOP (binned) | i-th Result | Lat $\phi_i$ | Lon $\lambda_i$ | Height $h_i$ | Lat Error $\phi_i-\phi_0$ | Lon Error $\lambda_i-\lambda_0$ | Height Error $h_i-h_0$ | HRMS |
|---|---|---|---|---|---|---|---|---|---|---|---|
| 1 | 120 | 7 | 1.2 | 1 | 48.1 | 12.3 | 600.5 | ... | ... | ... | → 20 cm |
| ... | 120 | 7 | 1.4 | 2 | 48.2 | 12.1 | 600.4 | ... | ... | ... | |
| ... | 120 | 7 | 1.4 | 3 | 48.1 | 12.2 | 600.3 | ... | ... | ... | |
| ... | ... | ... | ... | ... | ... | ... | ... | ... | ... | ... | |
| ... | 120 | 7 | 1.3 | n | 48.3 | 12.1 | 600.4 | ... | ... | ... | |
| 1 | 120 | 6 | 1.8 | 1 | 48.1 | 12.3 | 600.5 | ... | ... | ... | → 25 cm |
| ... | 120 | 6 | 1.7 | 2 | 48.2 | 12.1 | 600.4 | ... | ... | ... | |
| ... | 120 | 6 | 1.9 | 3 | 48.1 | 12.2 | 600.3 | ... | ... | ... | |
| ... | ... | ... | ... | ... | ... | ... | ... | ... | ... | ... | |
| ... | 120 | 6 | 1.8 | n | 48.3 | 12.1 | 600.4 | ... | ... | ... | |

-continued

| Freq | Epochs | Sats | HDOP (binned) | i-th Result | Lat $\phi_1$ | Lon $\lambda_1$ | Height $h_1$ | Lat Error $\phi_1$-$\phi_0$ | Lon Error $\lambda_1$-$\lambda_0$ | Height Error $h_1$-$h_0$ | HRMS |
|---|---|---|---|---|---|---|---|---|---|---|---|
| 1 | 120 | 5 | 2.1 | 1 | 48.1 | 12.3 | 600.5 | ... | ... | ... | → 30 cm |
| ... | 120 | 5 | 2.4 | 2 | 48.2 | 12.1 | 600.4 | ... | ... | ... | |
| ... | 120 | 5 | 2.3 | 3 | 48.1 | 12.2 | 600.3 | ... | ... | ... | |
| ... | ... | ... | ... | ... | ... | ... | ... | ... | ... | ... | |
| ... | 120 | 5 | 2.2 | n | 48.3 | 12.1 | 600.4 | ... | ... | ... | |

Each bin contains a lot of single position fixes (records) of the previously-collected rover data. For these binned positions the HRMS (horizontal error) is determined as $$HRMS = \sqrt{\frac{1}{n-1} \sum_{i=1}^{n} [(\varphi_i - \varphi_0)^2 + (\lambda_i - \lambda_0)^2]} \quad (26)$$

where n is the number of records in a bin, $\phi_i$ and $\lambda_i$ are the latitude and longitude of the position (computed from the data subset) of the $i^{th}$-record of a bin, $\phi_0$ and $\lambda_0$ are latitude and longitude of the known rover position.

The HRMS results of each bin are then parameterized, e.g. by fitting a curve to describe the relationship between HRMS and time (number of epochs). For example, for a given number of satellites tracked and HDOP value, parametric values $a_0$, $a_1$, $a_2$ are determined to relate HRMS to time t (number of epochs) according to the relation:

$$HRMS = a_0 + \frac{a_1}{1 + a_s t} \quad (27)$$

Figure 21:
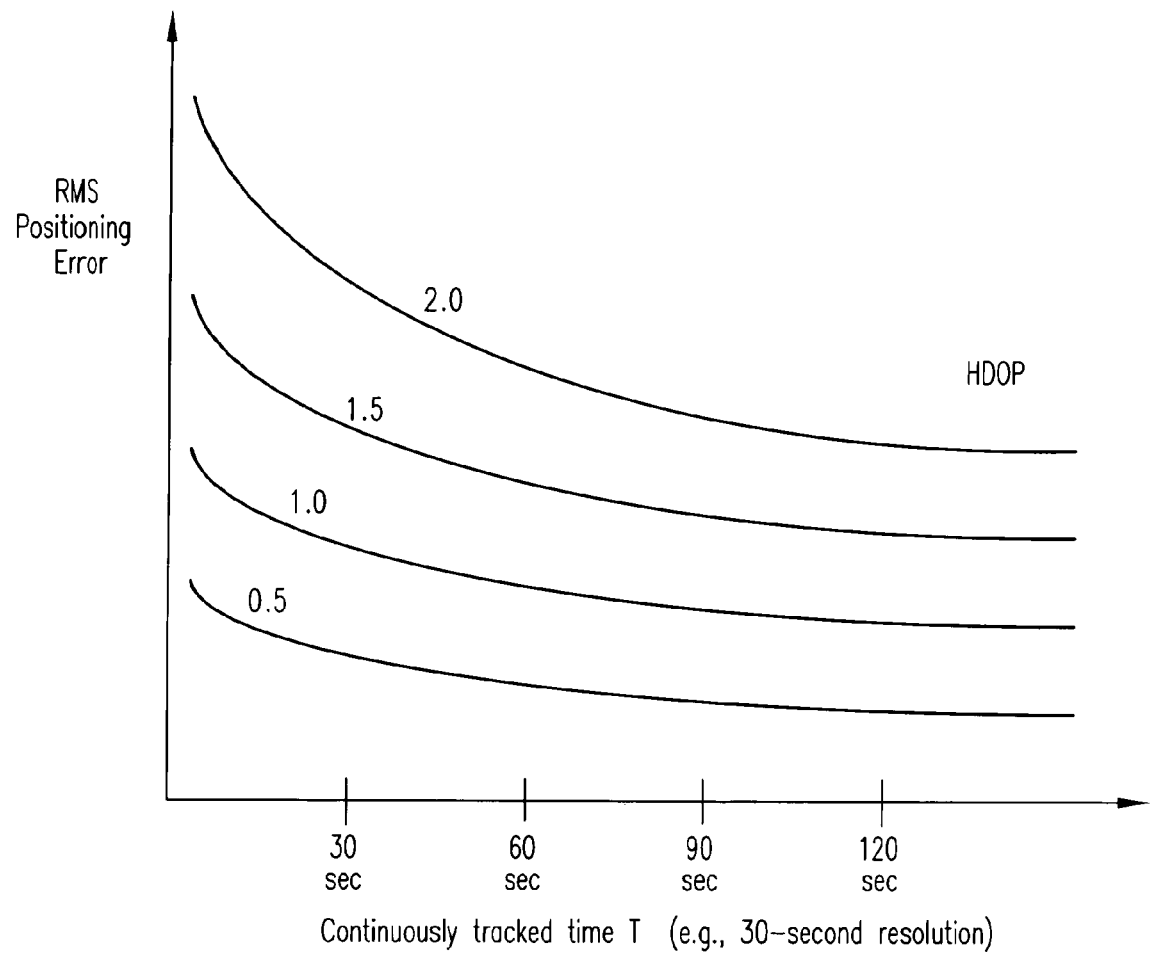
FIG. 21 illustrates for each of various HDOP values (bins) a parameterized relation between RMS positioning error and duration of continuously-tracked rover data (for a given number of satellites tracked) in accordance with some embodiments of the invention.
Figure 22:
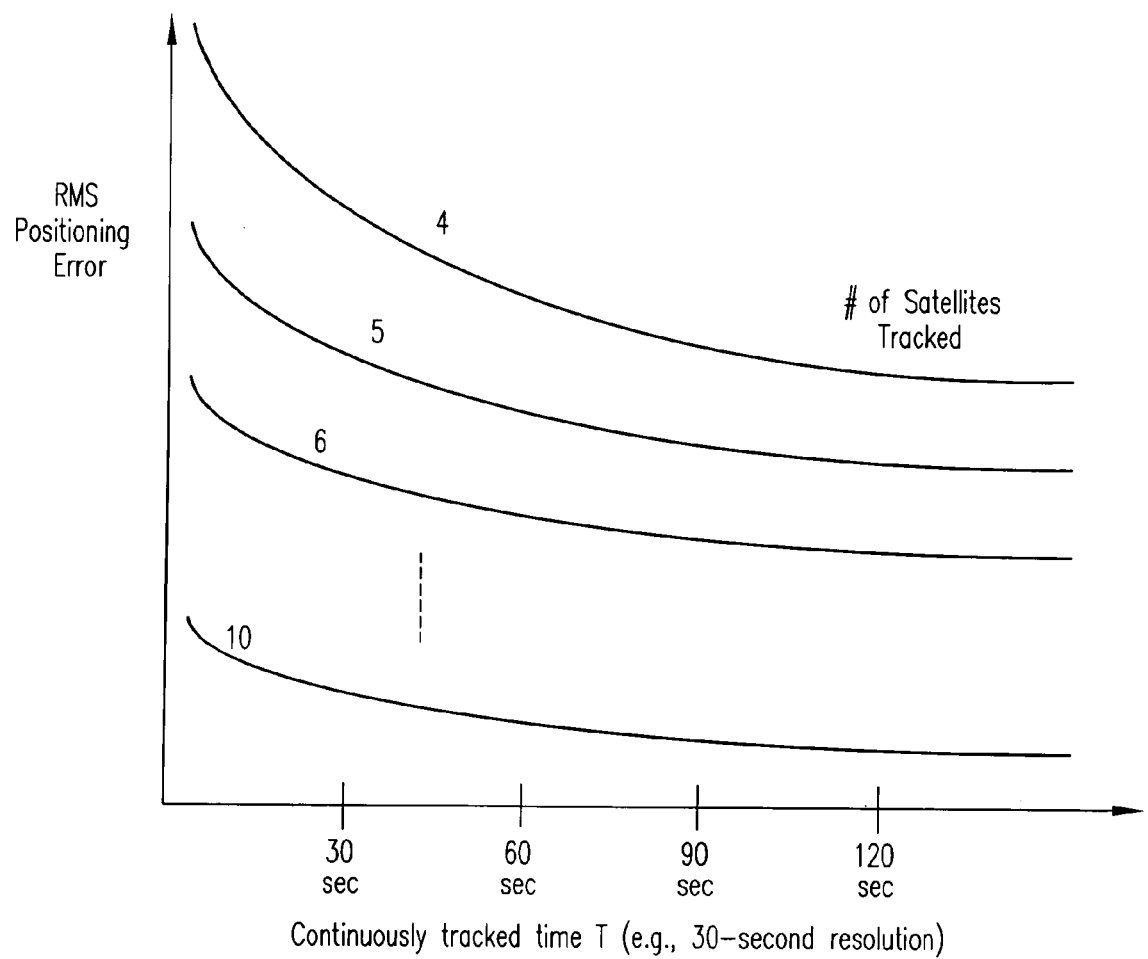
FIG. 22 illustrates for each of various numbers of satellites tracked (bins) a parameterized relation between RMS positioning error and duration continuously-tracked rover data (for a given HDOP value) in accordance with some embodiments of the invention.

The parameters $a_0$, $a_1$, $a_2$ are thus related to the number of frequencies, number of satellites tracked and HDOP. The fitting function is repeated for each combination (of number of frequencies, number of satellites tracked, and HDOP) to obtain a set of parameters $a_0$, $a_1$, $a_2$ describing the time dependence of HDOP. Parameters $a_0$, $a_1$, $a_2$ are place in a lookup table which is stored in the rover for PPA determination during data collection. FIG. 21 illustrates for each of various HDOP values (bins) a parameterized relation between RMS positioning error and duration continuously-tracked rover data (for a given number of satellites tracked). FIG. 22 illustrates for each of various numbers of satellites tracked (bins) a parameterized relation between RMS positioning error and duration continuously-tracked rover data (for a given HDOP value). The relationships for HDOP values and number of satellites tracked are shown separately in FIGS. 21 and 22 for convenience of illustration. It will be understood that for purposes of the PPA lookup table a parameterized relation can be established for each combination of HDOP value and number of satellites tracked and number of frequencies.

Figure 23:
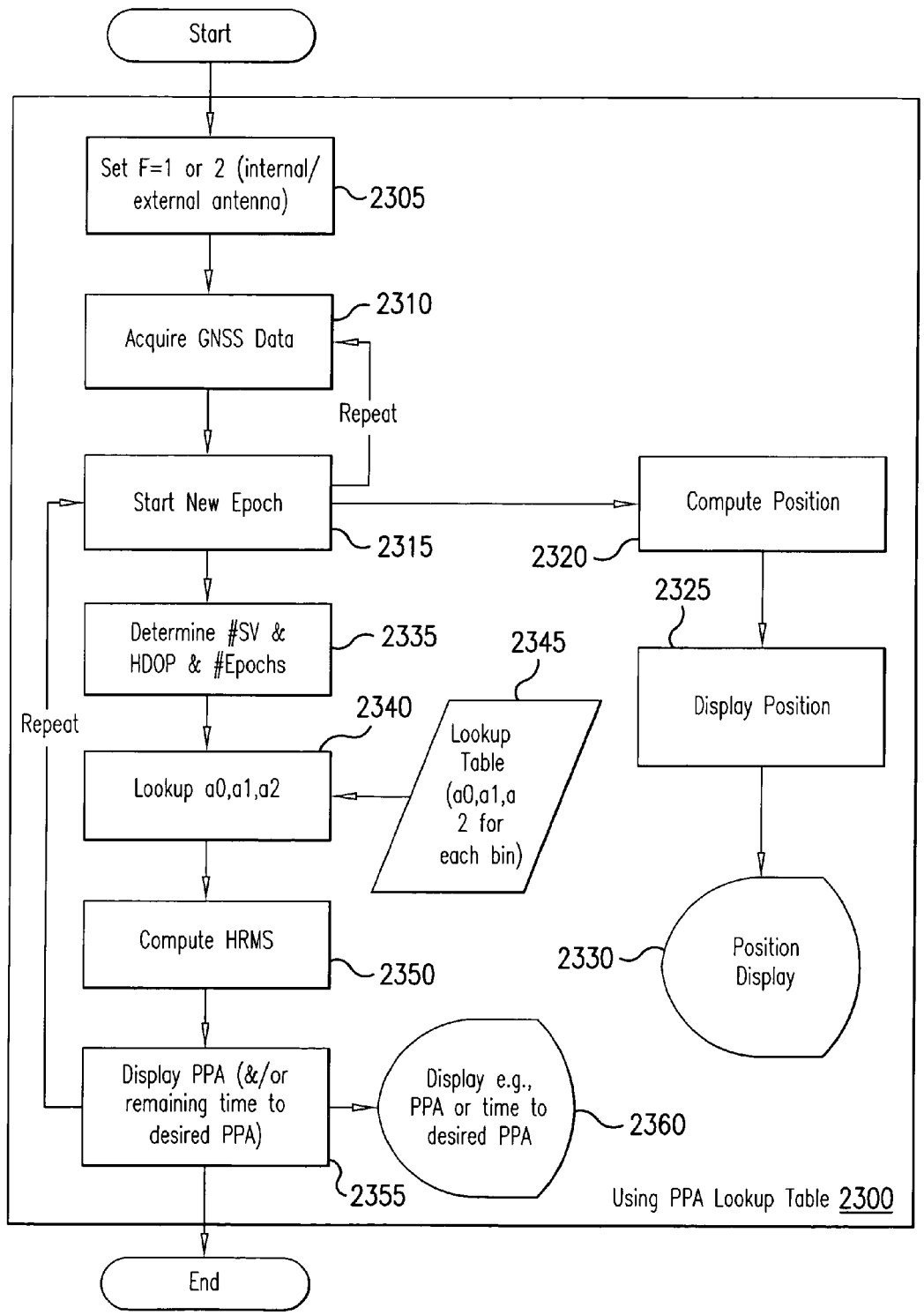
FIG. 23 shows a process using a PPA lookup table in a GNSS rover receiver during data collection in accordance with some embodiments of the invention.

FIG. 23 shows a process 2300 using a PPA lookup table in a GNSS rover receiver during data collection in the field in accordance with some embodiments of the invention. When the receiver starts operation, a determination is made at 2305 as to the number of frequencies being tracked, e.g., whether L1 single-frequency or L1/L2 dual frequency is determined in Trimble handheld GNSS receivers according to the type of antenna in use. GNSS data is acquired at 2310 and, typically, whenever an epoch of data is available a position is computed at 2320 and displayed at 2325 on a display screen 2330 or the like. Processing in the rover can include a coarse (not differentially-corrected) position determination and display of position. In accordance with some embodiments of the invention, the collected data is examined at 2335 (e.g., at each epoch) for the number of satellites tracked, HDOP and number of epochs of data continously collected. For these values, a set of parameters $a_0$, $a_1$, $a_2$ is looked up in the lookup table, and the corresponding HRMS value is computed using Equation (27). This value is displayed as the expected PPA on a display screen 2360 or the like. Alternatively, or in addition to display of the HRMS value, a time (number of epochs) is calculated from the inverted Equation (27) for a desired HRMS value. The remaining time to achieve the desired HRMS value is displayed so that the user knows when enough data has been collected and/or another form of indication (e.g., an audible or visible signal) is given to indicate when enough data has been collected to achieve the desired HRMS value.

Figure 24:
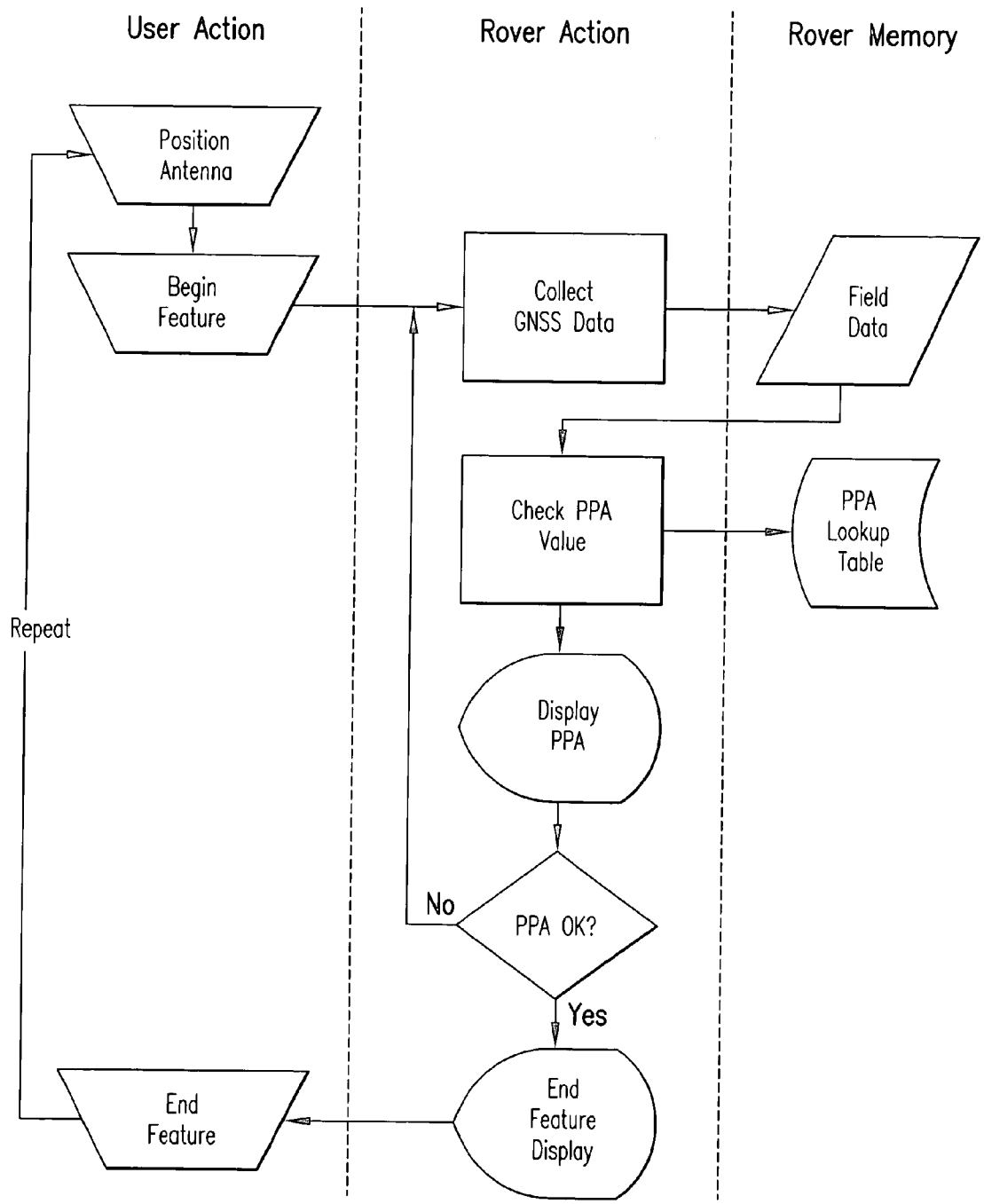
FIG. 24 is an operational view of GNSS data collection with a rover in accordance with some embodiments of the invention.

FIG. 24 an operational view of GNSS data collection with a rover in accordance with some embodiments of the invention. A user positions the rover antenna at a feature and initiates data collection at the feature. The rover collects GNSS data and stores it to memory. The collected GNSS data is used to look up a PPA value in a PPA lookup table, and the PPA value (and/or time remaining to a desired PPA value) is displayed. GNSS data collection continues until the PPA value meets requirements. When the PPA value meets requirements, the user is so informed by an end-feature display or other indication. The user terminates operation at the feature and repositions the antenna at another feature.

Figure 25:
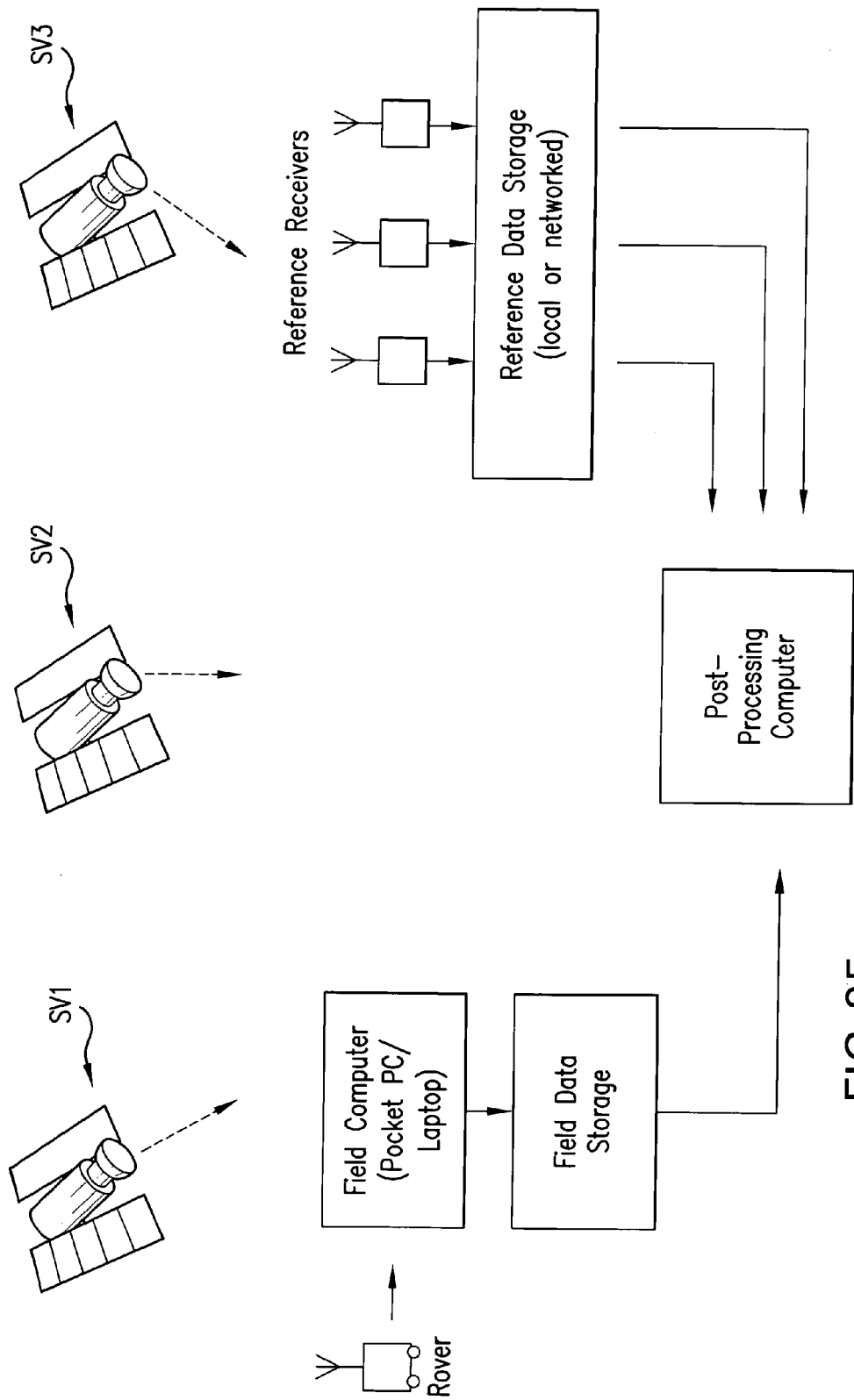
FIG. 25 is a high-level view of GNSS data-collection operations in accordance with some embodiments of the invention

FIG. 25 is a further high-level view of operations in accordance with some embodiments of the invention. A rover 2510 is used to collect data from satellites SV1, SV2, ... SVN. The data from rover 2510 is optionally transferred to a field computer 2515 such as a Pocket PC or laptop personal computer, which may include a field data storage device 2520 such as a magnetic or optical disk drive or non-volatile memory or other type of storage. The collected data is transferred by any suitable means to a post-processing computer 2525. Post-processing computer 2525 accesses reference data from reference-data storage 2530 (e.g., local or networked storage). The reference data is provided by one or more reference receivers 2535. Post-processing computer 2525 preferably employs an embodiment of the post-processing engine described above, with or without multi-baseline adjustment as described above. Rover 2510 can be used to collect a set of data from which post-processing computer 2525 prepares a PPA table as described above. Such a PPA table can be used in rover 2510 or field computer 2515 during data collection to determine a PPA value or a remaining time to obtain a desired PP accuracy as described above.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Additional References incorporated herein by this reference:

1. K. CHEN et al., *Real-Time Precise Point Positioning Using Single Frequency Data*, ION GNSS 18$^{TH}$ INTERNATIONAL TECHNICAL MEETING OF THE SATELLITE DIVISION, 13-16 Sep. 2005, Long Beach, Calif., pp. 1514-1523.
2. E. GILL et al., *High-Precision Onboard Orbit Determination for Small Satellites—the GPS-Based XNS on X-SAT*, 6$^{TH}$ SYMPOSIUM ON SMALL SATELLITES SYSTEMS AND SERVICES, September 20-24, La Rochelle, France, 2004, pp. 1-6.
3. S. LEUNG et al., *High Precision Real-Time Navigation for Spacecraft Formation Flying*, ION GPS/GNSS 2003, 9-12 Sep. 2003, Portland, Oreg., pp. 2182-2193.
4. B. REMONDI et al., FINAL REPORT: INVESTIGATION OF GLOBAL POSITIONING SYSTEM SINGLE FREQUENCY HARDWARE FOR THE U.S. ENVIRONMENTAL PROTECTION AGENCY, EPA Reference DW13936132-01-0, April 1994, ten pages.
5. T. YUNCK, Single-*Frequency Precise Orbit Determination*, GLOBAL POSITIONING SYSTEM: THEORY AND APPLICATIONS VOLUME II, Volume 164 Progress in Astronautics and Aeronautics, pp. 581-584.
6. GETTING STARTED GUIDE: GEOEXPLORER 2005 SERIES, Version 1.00, Revision A, Part Number 46506-40-ENG, October 2005, Trimble Navigation Limited, 114 pages.
7. WHITE PAPER: H-STAR TECHNOLOGY EXPLAINED, Trimble Navigation Limited, 2005, 9 pages.
8. QUICK REFERENCE GUIDE: TRIMBLE GPSCORRECT EXTENSION, Version 1.10, Revision A, April 2005, Trimble Navigation Limited, 114 pages.
9. TRIMBLE GPSCORRECT EXTENSION: RELEASE NOTES, Version 1.11, Revision A, October 2005, Trimble Navigation Limited, 38 pages.
10. GETTING STARTED GUIDE: GPS PATHFINDER OFFICE SOFTWARE, Version 3.10, Revision A, Part Number 34231-31-ENG, April 2005, Trimble Navigation Limited, 158 pages.
11. GPS PATHFINDER OFFICE RELEASE NOTES, Version 3.10, Part Number 34195-31-ENG, Revision A, April 2005, Trimble Navigation Limited, 24 pages.
12. USER GUIDE: GPS PATHFINDER PRO SERIES, Version 1.00, Revision A, May 2005, Trimble Navigation Limited, 46 pages.
13. GPS PATHFINDER TOOLS SDK: RELEASE NOTES, Version 2.00, Part Number 37237-61-ENG, Revision A, June 2005, 44 pages.
14. REFERENCE MANUAL: TERRASYNC SOFTWARE, Version 2.50, Revision A, April 2005, Trimble Navigation Limited, 352 pages.
15. GETTING STARTED GUIDE: TRIMBLE GPS ANALYST EXTENSION, Version 1.10, Revision A, Part Number 52652-01, April 2005, 240 pages.

TRIMBLE GPS ANALYST EXTENSION: RELEASE NOTES, Version 1.10, Part Number 52652-01, Revision A, April 2005, 28 pages.

Innovative concepts described and illustrated herein include the following:

1. A method of preparing GNSS reference data for processing data acquired by a GNSS receiver at times corresponding to first intervals, comprising:
   a. Accessing reference data having measurements taken at times corresponding to second intervals longer than the first intervals,
   b. Determining a geometric component for each measurement,
   c. Producing for each measurement a geometry-free residual by subtracting the geometric component from the measurement, d. Interpolating the geometry-free residuals to produce interpolated residuals for times corresponding to the first intervals, e. Determining a geometric component for each time corresponding to an interpolated residual, f. For each time corresponding to the first intervals, combining the interpolated residual for that time with the geometric component for that time to produce an interpolated reference measurement for that time.

2. The method of 1, wherein interpolating the geometry-free residual for given time comprises preparing a linear interpolation over a second interval spanning the given time.

3. The method of 2, wherein preparing a linear interpolation comprises determining phase change rate of the residuals.

4. The method of 2, wherein the measurements are taken from GNSS signals of at least two carrier frequencies, and wherein preparing a linear interpolation comprises determining a phase-change rate and determining an interpolated code residual using the phase-change rate.

5. The method of 1, wherein interpolating the geometry-free residual for a given time comprises running a linear Kalman filter over period including the given time.

6. The method of one of 1-5, wherein the reference data comprises carrier-phase measurements, and wherein the method comprises performing steps 1.a.-1.e. for the carrier-phase measurements.

7. The method of one of 1-6, wherein the reference data comprises code measurements, and wherein the method comprises performing steps 1.a.-1.e. for the code measurements.

8. A method of preparing GNSS reference data for processing data acquired by a GNSS receiver during an acquisition period, comprising, a. Accessing GNSS reference data acquired during a reference period substantially longer than the acquisition period, the GNSS reference data comprising code measurements and carrier-phase measurements, b. Preparing a geometry-free and ionosphere-free code-minus-carrier observable from GNSS reference data, c. Averaging the code-minus-carrier observable over the reference period to obtain respective mean carrier-ambiguity values for each of a plurality of carrier frequencies, d. Producing a set of pre-processed reference data by combining the mean carrier-ambiguity values with the carrier-phase measurements.

9. The method of 8, further comprising interpolating carrier-phase measurements as in one of 1-7, wherein producing a set of pre-processed reference data comprises combining the mean carrier-ambiguity values with interpolated carrier-phase measurements.

10. The method of one of 8-9 wherein the acquisition period ranges from one minute to several minutes and wherein the reference period ranges from one hour to several hours.

11. A method of processing data acquired by a GNSS receiver, comprising:

a. Producing a set of pre-processed reference data as in one of 8-10, and b. Preparing single-differenced minimum-error combination observations between the rover data and the pre-processed reference data.

12. The method of 11, further comprising filtering the single-difference minimum-error combination observations with a Kalman filter having states for receiver position, receiver clock and ambiguities.

13. The method of 11 or 12, wherein the minimum-error combination observations comprise L-1 phase and an L1-phase plus L1-code combination 14. The method of one of 12-13, wherein the Kalman filter has two rover-clock states and alternates between the two rover-clock states when processing successive epochs of data.

15. The method of 14, wherein the Kalman filter has two rover-position states and alternates between the rover-position states when processing successive epochs of data.

16. The method of 14, wherein the Kalman filter has two rover-position states, further comprising determining from the rover position states whether the receiver has changed position by more than a predetermined amount from a prior epoch to a current epoch 17. The method of 16, further comprising estimating change of rover position between a prior epoch and a current epoch from phase measurement differences between the prior epoch and the current epoch.

18. The method of 17, wherein estimating change of rover position comprises applying a decorrelated delta-phase observable.

19. A method of differential processing of data acquired by a GNSS receiver with multi-frequency GNSS reference data, comprising applying a whitening of noise technique to reduce non-Gaussian positioning errors.

20. A method of differentially-processing GNSS data in accordance with one of 1-19, comprising: applying a Kalman filter having position states for current epoch and for previous epoch and an ambiguity state for each satellite to prepare a backward estimate of position and ambiguities for the GNSS receiver, and applying a Kalman filter having position states for current epoch and for previous epoch and an ambiguity state for each satellite to prepare a forward estimate of position and ambiguities for the GNSS receiver.

21. The method of 20, wherein the backward estimate and the forward estimate are prepared with GNSS receiver data collected over a period substantially longer than a feature-occupation time.

22. The method of 20 or 21, further comprising combining the backward estimate and the forward estimate to produced a smoothed position estimate.

23. A method of processing data acquired by a GNSS receiver, comprising:

a. Determining a position estimate of the GNSS receiver by processing the data with reference data from a selected reference receiver, b. Repeating step a. to obtaining a position estimate of the GNSS receiver for each of a plurality of reference receivers, c. Averaging the position estimates to produce a final position estimate of the GNSS receiver.

24. The method of 23, wherein averaging the position estimates comprises applying a weighting function proportional to quality of the position estimates.

25. The method of 24, wherein quality of the position estimates is determined from at least one of: number of satellites tracked, positional dilution of precision, baseline length from the GNSS receiver to reference receiver, number of epochs of valid data, and root-mean-square of residual errors.

26. The method of 24 or 25, wherein quality of the position estimates is determined from quantities used to estimate covariance of coordinates of the position estimates.

27. The method of one of 24-26, wherein the weighting function is in inverse relation to covariance.

28. The method of one of 24-27, wherein multiple position estimates are prepared for each reference station and one of the position estimates is selected from among the multiple position estimates.
29. The method of 28, wherein the multiple position estimates comprise an intermediate L1 float solution and an intermediate L1/L2 float solution.
30. The method of one of 23-29, wherein the position estimates comprise intermediate code solutions and wherein averaging comprises averaging the intermediate code solutions to produce an adjusted code solution.
31. The method of one of 23-30, wherein the position estimates comprise intermediate float solutions and wherein averaging comprises averaging the intermediate float solutions to produce an adjusted float solution.
32. The method of one of 23-29, wherein the position estimates comprise intermediate code solutions and intermediate float solutions, wherein averaging comprises averaging the intermediate code solutions to produce an adjusted code solution and averaging the intermediate float solutions to produce an adjusted float solution.
33. The method of 32, further comprising combining the adjusted float solution and the adjusted code solution to produce a final solution.
34. A method of preparing a post-processing accuracy table, comprising:
   a. Acquiring a set of GNSS data,
   b. Processing a subset of the GNSS data to produce a result for the subset,
   c. Repeating step b. for various subsets of the GNSS data to produce a result for each subset,
   d. Sorting the results into bins according to common features of the subset,
   e. For each bin, determining parameters to characterize the results of the bin, and storing the parameters and the common features of the subset in a table.
35. The method of 34, wherein the parameters characterize results of the bin as positioning error versus amount of data in the subset.
36. The method of 34 or 35, wherein the common features comprise one or more of: number of frequencies of GNSS data, number of epochs of data, number of satellites tracked, horizontal dilution of precision, and position dilution of precision.
37. A method of predicting post-processing accuracy in a GNSS receiver, comprising:
   a. Acquiring GNSS data with the receiver,
   b. Determining at least one feature from the data,
   c. Using the at least one feature to look up in a previously-prepared table a set of parameters characterizing a relationship between positioning error and amount of data acquired, and
   d. Determining from the set of parameters at least one of: an expected post-processed-position error, and an amount of data needed to achieve a desired post-processed position error.
38. The method of 37, wherein the parameters characterize results of the bin as positioning error versus amount of data in the subset.
39. The method of 37 or 38, wherein the at least one feature comprises at least one of: number of frequencies of GNSS data, number of epochs of data, number of satellites tracked, horizontal dilution of precision, and position dilution of precision.
40. A stored data structure useful for estimating post-processing accuracy during collection of GNSS data, comprising: a set of parameters characterizing a relationship between positioning error and amount of data acquired for at least one feature of acquired data.
41. The data structure of 40, wherein the at least one feature comprises at least one of: number of frequencies of GNSS data, number of epochs of data, number of satellites tracked, horizontal dilution of precision, and position dilution of precision.
42. A storage medium containing a data structure according to one of 40 or 41.
43. Apparatus for performing any one or more of the above methods.
44. Methods and apparatus incorporating a Kalman-filter-based interpolation scheme that can interpolate reference data to any desired data rate.
45. Methods and apparatus apply the L1-only code-plus-carrier combination for differential positioning.
46. Super-smoothing of the reference pseudo-range data for differential positioning (use substantially more reference data than collected data).
47. Motion detection using Kalman filter states.
48. Multi-baseline adjustment (MBA)
49. Methods and apparatus for predicting post-processing accuracy while collecting GNSS measurement data, in which parameters of the collected data are used to look up post-processing accuracy values in a lookup table prepared from a set of known data.
50. Combinations of 44-49 to deliver high-precision accuracy with short convergence time.
51. Methods and apparatus for predicting post-processing accuracy while collecting GNSS measurement data, in which parameters of the collected data are used to look up post-processing accuracy values in a lookup table prepared from a set of known data.

The invention claimed is:
1. A method of determining position of a rover from observations of GNSS signals, comprising:
   a. obtaining observations of GNSS signals at a rover location,
   b. obtaining observations of the GNSS signals at a plurality of reference stations, each reference station defining a respective baseline between the rover location and a reference station location,
   c. for each reference station, determining a respective differentially-corrected rover position, wherein at least one of the differentially-corrected rover positions is based on one of (i) a multiple-frequency ionosphere-free observable combination, (ii) a multiple-frequency code-phase observable combination, and (iii) a single-frequency carrier-phase and code-plus-carrier-phase combination, and
   d. preparing a weighted combination of the differentially-corrected rover positions.
2. The method of claim 1, further comprising determining a quality measure for each of the differentially-corrected rover positions and preparing the weighted combination as a function of the quality measures.
3. The method of claim 2, wherein the quality measure is an inverse covariance.
4. The method of claim 1, wherein at least one of the differentially-corrected rover positions is based on a single-frequency observable combination.
5. Apparatus for determining position of a rover from observations of GNSS signals collected at a rover location and at a plurality of reference stations, each reference station defining a respective baseline between the rover location and a reference station location, comprising a. an element to determine, for each reference station, a respective differentially-corrected rover position, wherein at least one of the differentially-corrected rover positions is based on one of (i) a multiple-frequency ionosphere-free observable combination, (ii) a multiple-frequency code-phase observable combination, and (iii) a single-frequency carrier-phase and code-plus-carrier-phase combination, and
b. an element to prepare a weighted combination of the differentially-corrected rover positions.

6. The apparatus of claim 5, further comprising an element to determine a quality measure for each of the differentially-corrected rover positions, wherein the weighted combination is prepared as a function of the quality measures.

7. The apparatus of claim 5, wherein the quality measure is an inverse covariance.

8. The apparatus of claim 5, wherein at least one of the differentially-corrected rover positions is based on a single-frequency observable combination.

9. An article of manufacture comprising a computer-readable medium having instructions stored therein for causing a machine to perform the method of claim 1.

* * * * *